United States Patent [19]
Yoshikawa et al.

[11] Patent Number: 6,061,516
[45] Date of Patent: May 9, 2000

[54] ONLINE APPLICATION PROCESSING SYSTEM

[75] Inventors: Akihiro Yoshikawa; Yutaka Kudo, both of Yokohama; Takaaki Haruna, Tokyo; Shinobu Koizumi, Sagamihara; Hideya Kawahara, Yokohama, all of Japan

[73] Assignee: Hitachi, Ltd., Tokyo, Japan

[21] Appl. No.: 08/911,441

[22] Filed: Aug. 12, 1997

[30] Foreign Application Priority Data

Aug. 13, 1996 [JP] Japan .................................... 8-213453
Nov. 27, 1996 [JP] Japan .................................... 8-315921

[51] Int. Cl.$^7$ ................................................ G06F 15/163
[52] U.S. Cl. .......................................................... 395/702
[58] Field of Search ............................................. 395/702

[56] References Cited

U.S. PATENT DOCUMENTS

| | | | |
|---|---|---|---|
| 5,535,422 | 7/1996 | Chiang et al. | 345/338 |
| 5,615,339 | 3/1997 | Ban | 395/200.57 |
| 5,675,752 | 10/1997 | Scott et al. | 345/333 |
| 5,734,828 | 3/1998 | Pendse et al. | 395/200.33 |
| 5,768,528 | 6/1998 | Stumm | 395/200.61 |
| 5,778,367 | 7/1998 | Wesinger, Jr. et al. | 707/10 |
| 5,826,242 | 10/1998 | Montulli | 705/27 |

OTHER PUBLICATIONS

"Rumba", Wall Data Inc. of the U.S., provides program parts that may be used in conjunction with Visual Basic, a Windows application development tool for Microsoft.

"EVB–SDK", a Visual Basic compatible application development support kit from Chori Information System Co. of Japan.

"XMAP2E2", Hitachi, Ltd. of Japan, a terminal message mapping support system.

F. Cummins et al, "Wrapping Legacy Applications", First Class, Mar.–Apr., 1994, vol. IV, Issue II, p. 10, p. 20.

Enterprise/Access: Web Edition, Jun. 14, 1996, pp. 1–4.

Shafrir et al., Visual Access to Hyper–Information Using Multiple Metaphors with Graphic Affordances, 1994, p. 142 and 483.

McDuffe, J. Online with a Mainframe: Moving the Mountain to the Microprocessor, 1992, p.323–327.

Sleeter, M., OpenDoc–Building Online Help for a Component–Oriented Architecture, 1996, p.87–94.

*Primary Examiner*—Eric W. Stamber
*Assistant Examiner*—John Q. Chavis
*Attorney, Agent, or Firm*—Beall Law Offices

[57] ABSTRACT

An online application processing system capable of carrying out online application processing through the use of an easy-to-operate GUI environment takes advantage of the fact that the types of data exchanged by online application programs with a host terminal have conventionally been determined by the specifications of the terminal and are thus common to numerous online application programs. By matching data formats so that existing online application programs are used without modification, a GUI processing program is used as a host access program.

9 Claims, 23 Drawing Sheets

FIG. 7

| | SCREEN NAME 90 | FIELD NAME 91 | I/O DISTINCTION 92 | X COORDINATE 93 | Y COORDINATE 94 | LENGTH 95 | DATA TYPE 96 | ATTRIBUTE 97 | CHARACTER STRING 98 |
|---|---|---|---|---|---|---|---|---|---|
| 100 | ABP010 | ABFFNAME | FIXED | 2 | 2 | 4 | JAPANESE | BLUE | NAME |
| 101 | ABP010 | ABFONAME | OUTPUT | 12 | 2 | 12 | JAPANESE | WHITE | |
| 102 | ABP010 | ABFEFURI | I/O | 20 | 4 | 10 | ALPHANUMERIC | GREEN | |
| 103 | ABP010 | ABFIRYOH | INPUT | 20 | 6 | 7 | NUMERIC | GREEN | |

FIG. 8

| "ABP010" | F | 2 | 2 | "NAME" | O | 12 | 2 | 2 | "HAJIME SUZUKI" | I O | 20 | 4 | "2-1234567" | I | 20 | 10 |
|---|---|---|---|---|---|---|---|---|---|---|---|---|---|---|---|---|
| 130 | 131 | 132 | 133 | 134 | 135 | | | | 136 | | | | 137 | | | |

```
STRING S ;
STRING MESSAGEGET (INT X, INT Y, INT LEN) ;                    141
STRING MESSAGESET (STRING MSG, INT X, INT Y, INT LEN) ;

VOID W_ABP010_SET (STRING MSG) {
164~MESSAGEMAP (MSG) ;
    W_ABP010 = WINDOW CREATE () ;~165
                                                                143
166~F_ABFFNAME = LABEL CREATE (W_ABP010, 2, 2, 4) ;
    LABELSETCAPTION (F_ABFFNAME, "NAME") ;   ~167
168~LABELSETCOLOR (F_ABFFNAME, COLOR_BLUE) ;

F_ABFONAME = LABELCREATE(W_ABP010, 12, 2, 12) ;
169~
    S = MESSAGEGET (12, 2, 12) ;
    LABELSETCAPTION (F_ABFONAME, S) ;

LABELSETCOLOR (F_ABFONAME, COLOR_WHITE) ;
170~F_ABFEFURI = TEXTCREATE (W_ABP010, 20, 4, 10) ;
    S = MESSAGEGET (20, 4, 10) ;
    LABELSETCAPTION (F_ABFEFURI, S) ;
    TEXTSETCOLOR (F_ABEFURI, COLOR_GREEN) ;
    F_ABFIRYOH = TEXTCREATE (W_ABP010, 20, 6, 7) ;
    TEXTSETCOLOR (F_ABFIRYOH, COLOR_GREEN) ;
171~
    B_SEND = BUTTONCREATE (W_ABP010,
                BUTTON_LOWER_RIGHT, "EXECUTE") ;
    BUTTONADDEVENT (B_SEND,
                BUTTON_CLICK, W_ABP010_GET) ;
}

VOID W_ABP010_GET() {
    STRING MSG ;

S = TEXTGETCAPTION (F_ABFEFURI) ;   ~172
173~MESSAGESET (S, 20, 4, 10) ;
    S = TEXTGETCAPTION (F_ABFIRYOH) ;            ~142
    MESSAGESET (S, 20, 6, 7) ;

MSG = MESSAGEUNMAP () ;  ~174
    HOSTSEND (MSG)

WINDOWDELETE (W_ABP010) ;  ~175
    MSG = HOSTRECEIVE () ;
    FORMSET (MSG) ;
}
```

*FIG. 9*

151 ⌐ F_$F ̅= LABELCREATE (W_$P, $FX, $FY, $FL);

LABELSETCAPTION (F_$F, "$FS") ;
LABELSETCOLOR (F_$F, $FA) ;

FIG. 10

```
STRING S;
STRING MESSAGEGET (INT X, INT Y, INT LEN) ;
STRING MESSAGESET (STRING MSG, INT X, INT Y, INT LEN);
VOID W_$P_SHOW(STRING MSG) {
        MESSAGEMAP (MSG) ;
        W_$P = WINDOWCREATE () ;

$I⌐152

B_SEND = BUTTON CREATE (W_$P,
    BUTTON_LOWER_RIGHT,"EXECUTE") ;
    BUTTONADDEVENT (B_SEND, BUTTON_CLICK, W_$P_SEND) ;
}
VOID W_$P_SEND () {
        STRING MSG ;

$S⌐153

MSG = MESSAGEUNMAP () ;
    HOSTSEND (MSG) ;
    WINDOWDELETE (W_$P) ;
    MSG = HOSTRECEIVE () ;
    FORMSET (MSG) ;
}
```

FIG. 11

```
STRING S ;
VOID MAIN () {
      STRING MSG ;
      INITIALIZE () ;
      HOST CONNECT () ;         ~161
      MSG = HOSTRECIEVE () ;    ~162
FORMSET (MSG) ;
}
VOID FORMSET (STRING MSG) {
      S = FORMNAMEGET (MSG, 6) ;   ~163
      IF (STRINGEQUAL (S, "W_ABP010")) {   ~154
            W_ABP010_SET (MSG) ;

} ELSE IF (STRINGEQUAL (S, "W_ABP011")) {
            W_ABP011_SET (MSG) ;
      } ELSE {
            ...
            ...
            ...
      }
}
```

PARTS SPECIFICATION

CLASSIFICATION CODE · · · · · · · · · · — 301
PARTS CODE · · · · · · · · · ·
PARTS NAME — 302
DIMENSION

PARTS SPECIFICATION
CLASSIFICATION CODE      MM
PARTS CODE               MM3X10
PARTS NAME               MILLIMETER SCREW 3 X 10
DIMENSION                H3-W3-D10

FIG. 24

| SCREEN NAME | FIELD NAME | DATA OR VALUE |
|---|---|---|
| ABPO1O | ABFEBUNR | "         " |
|  | ABFEBUHC | "         " |
|  | ABFOBUHN | "         " |
|  | ABFOSIZE | "         " |

FIG. 25

| SCREEN NAME | FIELD NAME | DATA OR VALUE |
|---|---|---|
| ABPO1O | ABFEBUNR | " MM          " |
|  | ABFEBUHC | " MM3X10   " |
|  | ABFOBUHN | "MILLIMETER SCREW 3 X 10" |
|  | ABFOSIZE | "H3-W3-D10          " |

FIG. 26

```
<PRE><FORM ACTION="/TRO1/SIDO1/1">
    PARTS
    SPECIFICATION
CLASSIFICATION   <INPUT NAME="ABFEBUNR" TYPE="TEXT" SIZE=10 VALUE="    ">
CODE
    PARTS CODE   <INPUT NAME="ABFEBUHC" TYPE="TEXT" SIZE=10 VALUE="    ">
    PARTS NAME
    DIMENSIONS
                 <INPUT TYPE="SUBMIT" VALUE ="EXECUTE">
</FORM></PRE>
```

| TRANSACTION NAME | SCREEN NAME | FIELD NAME | INPUT/ OUTPUT DISTINCTION | X COORDINATE | Y COORDINATE | LENGTH | STRING TYPE | STRING EXAMPLE |
|---|---|---|---|---|---|---|---|---|
| TR01 | APB010 | ABFFTITL | FIXED | 10 | 2 | 8 | JAPANESE | PARTS SPECI- FICATION |
| TR01 | APB010 | ABFFBUNR | FIXED | 2 | 4 | 10 | JAPANESE | CLASSIFICATION CODE |
| TR01 | APB010 | ABFEBUNR | IN/OUT | 14 | 4 | 10 | ALPHANUMERIC | 1612 |
| TR01 | APB010 | ABFFBUHC | FIXED | 2 | 6 | 10 | JAPANESE | PARTS CODE |
| TR01 | APB010 | ABFEBUHC | IN/OUT | 14 | 6 | 10 | ALPHANUMERIC | 1614 |
| TR01 | APB010 | ABFFBUHN | FIXED | 2 | 8 | 6 | JAPANESE | PARTS NAME |
| TR01 | APB010 | ABFOBUHN | OUTPUT | 14 | 8 | 20 | JAPANESE | 1616 |
| TR01 | APB010 | ABFFSIZE | FIXED | 2 | 10 | 4 | JAPANESE | DIMENSIONS |
| TR01 | APB010 | ABFOSIZE | OUTPUT | 14 | 10 | 20 | ALPHANUMERIC | 1618 |

FIG. 27

| LOCATION INFORMATION | /TR01/SID01/1 | ~2401 |
|---|---|---|
| ABFEBUNR | MM | ~2402 |
| ABFEBUHC | MM3x10 | ~2403 |

FIG. 31

| | | |
|---|---|---|
| 2501~ ABFEBUNR | MM | ~2503 |
| 2502~ ABFEBUHC | MM3x10 | ~2504 |

FIG. 32

```
<PRE><FORM ACTION="/TR01/SID01/2">
    PARTS SPECIFICATION      SIZE = 10 VALUE = "MM">
CLASSIFIED CODE    <INPUT NAME = "ABFEBUNR" TYPE ="TEXT"
PARTS CODE         <INPUT NAME = "ABFEBUHC" TYPE ="TEXT"  SIZE = 10 VALUE = "MM3x10">
PARTS NAME         → MILLIMETER SCREW 3x10
DIMENSION          H3-W3-D10
<INPUT TYPE = "SUBMIT" VALUE = "EXECUTE">
</FORM></PRE>
```

*FIG. 33*

ONLINE APPLICATION PROCESSING SYSTEM

BACKGROUND OF THE INVENTION

The present invention relates to an online application processing system for performing application processing by gaining access to a host computer (also called a general-purpose or mainframe computer) via communication means. More particularly, the invention relates to an online application processing system utilizing easy-to-use graphical user interfaces (called GUIs) for application processing instead of conventional cumbersome screen interfaces made up mostly of characters and ruled lines.

Illustratively, Wall Data Inc. of the United States states that it has a host connectivity product called "RUMBA" provides program parts that may be used in conjunction with Visual Basic, a Windows application development tool from Microsoft. With RUMBA, users are said to be able to write in Visual Basic programs for accessing a host computer. In another example of the related art, a product called "EVB-SDK", a Visual Basic-compatible application development support kit from Chori Information System Co. of Japan, offers 10 Visual Basic-compatible program parts for communicative connections with a host computer as well as for key input control and key simulations.

In a further example of the related art, publications about a terminal message mapping support system called "XMAP2E2" from Hitachi, Ltd. of Japan state that the system permits easy development of an online application program for transmitting screen display information to terminals on the basis of screen definition information which defines field names, coordinates and data formats for displaying data on the screen. In a still further example, in a periodical "First Class", March/April, 1994, Vol. IV, Issue II (p. 10, p. 20) wrapping legacy applications are disclosed. In connection with this topic, the article discloses a concept of controlling old application programs via terminal interfaces.

Conventional online application programs are performed by a host computer that displays online application screens at a host terminal. These screens constitute a character-based user interface. Illustratively, when selecting one of a plurality of alternatives about any transaction through this interface, a user must input from a keyboard a code number corresponding to the desired alternative.

The character-based interface is lacking in screen display variations, thus it is hardly conducive to easy-to-understand grouping and displaying of data, such as the display of a highlighted indication of data portions in varying sizes in proportion to varying degrees of importance. By contrast, the GUI (graphical user interface) allows the user simply to click on any one of the multiple alternatives with a mouse for selection. The GUI also makes it easy, for example, to vary character size, enclose desired screen portions in a frame, and display pictures using image data.

In recent years, small computers such as so-called personal computers have dropped significantly in price so that they are more accessible than ever before. With their improved GUI capabilities, these computers provide users with better operability and more versatile expressions in display. Still, host computers have already accumulated hundreds of thousands of application programs, most of them having recourse to the character-based user interface for operation. Thus, technology is in demand which will enable these numerous application programs to be utilized with little modifications being made thereto through the use of a GUI providing the above-mentioned advantages.

To generate a program offering GUI capabilities while communicating with application programs on the host computer requires preparing two programs: a program for communicating with application programs on the host computer, and a program for constituting the GUI. The conventional techniques outlined above offer program parts facilitating generation of the program for accessing the host computer. Although such program parts makes it easy to prepare the program for communicating with the host computer, the program must be prepared manually in the conventional setup.

To provide users with user interfaces allowing them to access the host computer requires more processes: a process for receiving data from the host computer, for converting the received data to an appropriate format and for displaying the converted data; and a process for converting user-input data to an appropriate format and transmitting the converted data to the host computer. In the conventional setup, these processes must also be programmed manually.

Furthermore, typical online application programs are typically composed of tens to even hundreds of screens, and larger online application programs sometimes comprise even thousands of screens each. Besides the numerous screens involved, the contents of the communication between the host computer and the program for accessing it vary from one screen to another. The user interface also varies from screen to screen. This means that a program is needed for each of the screens involved. The labor required for preparing these programs is colossal. There has been no viable technique developed so far to prepare such programs automatically.

More specifically, although the above-described product "EVB-SDK" offers program parts that are convenient in creating user interfaces, manual work is still needed to arrange these program parts and to code procedures of exchange with other data. In addition, whereas the product requires the user to select appropriate user interface parts depending on the data format applicable to the host computer in question, it is difficult to make suitable choices for each of a plurality of screens involved.

The above-mentioned product "XMAP2E2" utilizes screen definition data in supporting the preparation of an application program to be run by the host computer. In this case, the process or apparatus for accessing the application program is restricted to the kind of access based on a fixed-function terminal or terminal protocols independent of the contents of the processing involved. The restriction makes it impossible to provide appropriate displays suitable for the contents of the application. Hence the difficulty in implementing beautiful, easy-to-use interfaces. Meanwhile, the application program performed by the host computer carries out a host terminal control process and an error checking process for screen input and output in addition to the core processes such as calculations and database updates. As a result, the program becomes so bulky that it is difficult subsequently to add more functions to or make functional changes in the program.

The concept discussed in the magazine "First Class" includes techniques of how to exchange data between a host computer and other computers. The concept is analogous in nature to that of conventional terminal emulators. Furthermore, no process or apparatus for creating specific programs is disclosed in the publication.

SUMMARY OF THE INVENTION

It is an object of the present invention to overcome the above-mentioned drawbacks and disadvantage of the related art and to provide an online application processing system capable of carrying out online application processing through the use of an easy-to-operate GUI environment.

The online application processing system according to the invention takes advantage of the fact that the types of data exchanged by online application programs with the host terminal have conventionally been determined by the specifications of the host terminal and are thus common to numerous online application programs. With the system of the invention, such data formats are matched so that existing online application programs are used unchanged. Accordingly, a GUI processing program is generated for use as a host access program that operates in communication with existing programs. The GUI processing program is automatically generated by use of screen definition information that defines the contents of screens for the first computer acting as the host computer. This arrangement reduces man-hours needed for program development and thereby reduces development costs.

That is, the online application processing system according to the invention generates automatically a GUI processing program for communicating with existing online application programs. The processing program uses GUI controls for interfacing with those programs that are conventionally run by host computers having difficult-to-use screen interfaces made up mainly of characters and ruled lines.

In order for the GUI program to act as the host access program for communicating with an existing online application program, it is necessary to perform conversion between the data format meeting the specifications of the host terminal on the one hand, and the data format within the program. With the system of the invention, the conversion between these data formats is carried out by matching coordinate information included in the communication data with the names of data included in the screen definition information and with the coordinates in which the data is displayed on a conventional host terminal.

The GUI processing program is required to provide a GUI screen display and receive instructions from users. The inventive online application processing system generates this GUI processing program automatically as follows: the coordinates for the GUI screen display are first determined by use of the names of data included in the screen definition information and the coordinates of the data. The type of GUI to be used is then determined using two kinds of data: the names of the data included in the screen definition information, and the distinction of whether the data in question is input by or displayed for the user.

Where an online application program has been developed through the use of the conversion technique of the above-mentioned XMAP2E2, that means there is already available screen definition information for defining the contents of host screens. In such a case, the previously prepared screen definition information may be utilized. This translates into appreciable savings in manual work for preparing screen definition information anew.

In another case, the host computer may be connected via communication means not with the traditional host terminal but with a computer such as a personal computer or a workstation capable of displaying graphics. When a GUI processing program acting as a host access program is run on the personal computer or workstation, it is possible to add more functions (e.g., error checking processes) or make functional changes (e.g., change of input methods) by simply modifying the GUI processing program; there is no need to modify the online application program. The parts to be modified are limited and are thus easy to modify. In addition, the graphics display function of the personal computer or workstation may be used to provide a more aesthetic way to present processing contents and input procedures.

BRIEF DESCRIPTION OF THE DRAWINGS

FIG. 7 is a diagram of typical screen definition information 6 used in connection with the first embodiment;

FIG. 8 is a diagram of typical screen display information communicated via the communication means 3 used in connection with the first embodiment;

FIG. 9 is a diagram showing a subroutine in the host access program generated in step 52 and used in connection with the first embodiment;

FIG. 10 is a diagram showing a typical processing statement template 13 used to create the program of FIG. 9;

FIG. 11 is a diagram showing another typical processing statement template 13 used to create the program of FIG. 9;

FIG. 24 is a diagram showing an example of output logical information;

FIG. 25 is a diagram showing another example of output logical information;

FIG. 26 is a diagram showing an example of hypertext transmitted to a browser;

FIG. 27 is a diagram showing an example of screen definition information;

FIG. 31 is a diagram showing another example of a request for hypertext received from a browser at step 703 of the processing procedure shown in FIG. 20;

FIG. 32 is a diagram showing an example of input logical information; and

FIG. 33 is a diagram showing another example of hypertext transmitted to a browser.

DETAILED DESCRIPTION OF THE PREFERRED EMBODIMENTS

The preferred embodiments of the invention will now be described in more detail with reference to the accompanying drawings. The present invention is first outlined below by referring to FIGS. 1 through 4.

Figure 3:
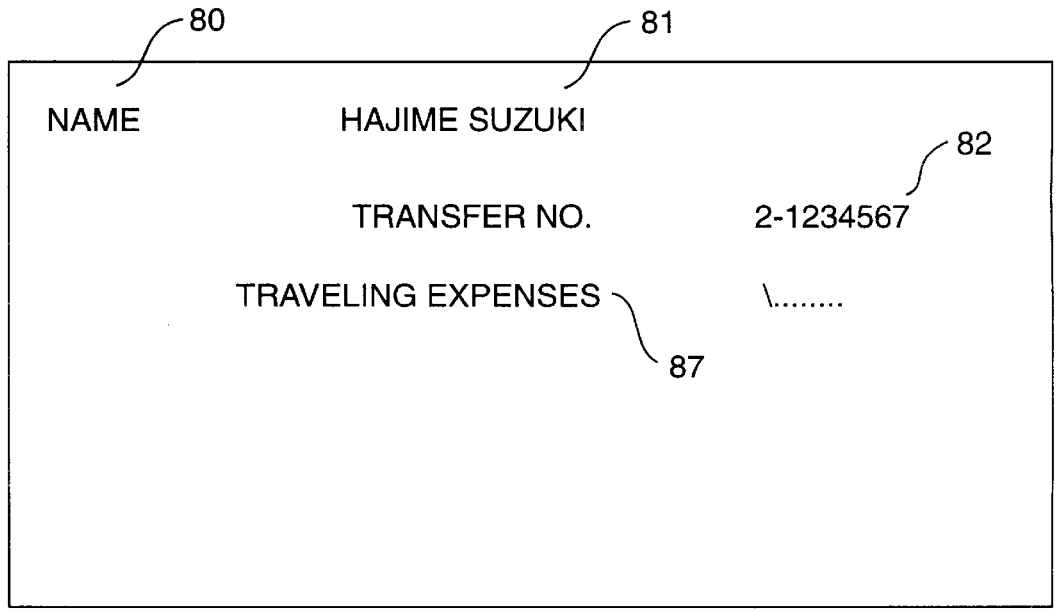
FIG. 3 is a view of a typical screen displayed on a terminal by the typical conventional online application program.
Figure 4:
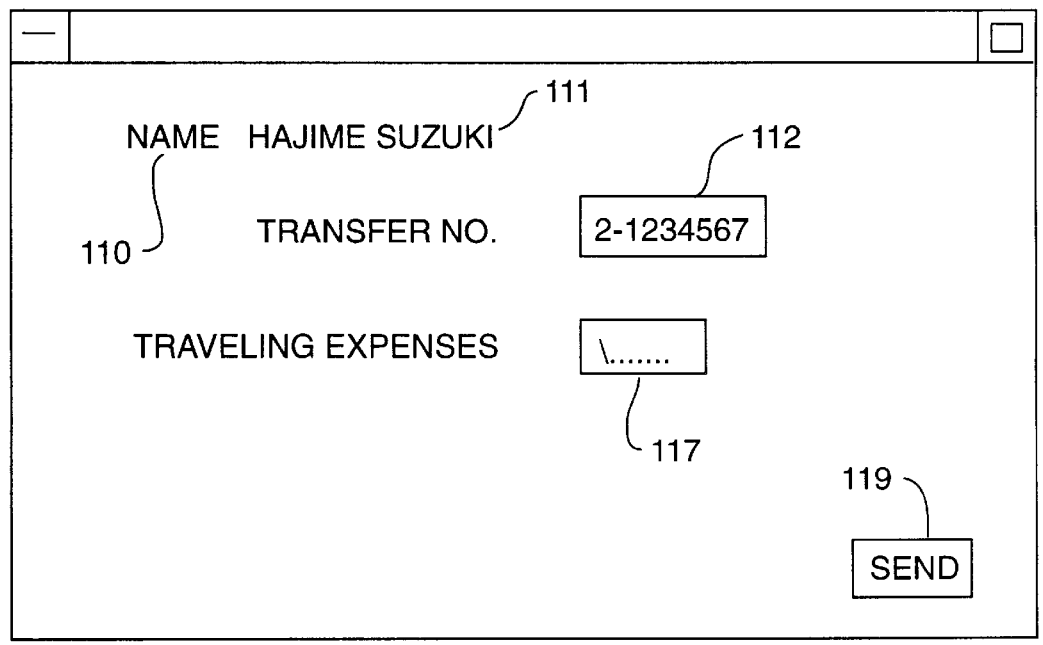
FIG. 4 is a view of a typical screen display of a GUI processing program generated by the online application processing system embodying the invention.

FIG. 3 is a view of a typical screen displayed on a terminal by a conventional online application program. FIG. 4 is a view of a typical screen display of a GUI processing program generated by an online application processing system embodying the invention. As shown by the comparison, window system functions are incorporated in the personal computer or workstation to provide an aesthetic, easy-to-use GUI environment. As mentioned earlier, one feature of the present invention is to provide an online application processing system that is easier to use and offers more aesthetic displays than ever before without modifying existing online application programs.

Figure 2:
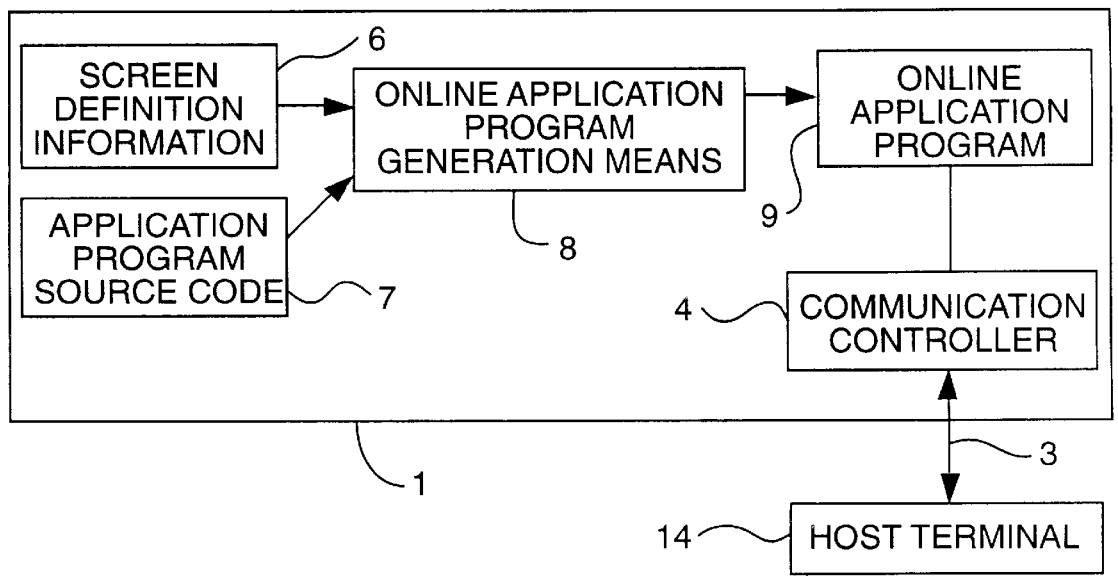
FIG. 2 is a block diagram of a typical conventional online application processing system.

A conventional online application processing system will now be described. FIG. 2 is a block diagram of a typical conventional online application processing system. In FIG. 2, reference numeral 1 denotes a host computer. The host computer 1, also called a general-purpose or mainframe computer, will be referred to as the host computer or simply the host throughout the description that follows. A host terminal 14 has a display unit and a keyboard for displaying information on the screens and for accepting user inputs. Communication means 3 of any suitable type is used for data communication between the host computer 1 and the host terminal 14, such as a communication bus, intranet, LAN, WAN, internet, etc. connection.

In the host computer 1, screen definition information 6 is used to generate an online application program 9. An application program source code 7 describes procedures of online application processing in programming language. Also in the host computer 1, online application program generation means 8 generates the online application program 9 by combining two processes: a process for displaying information on the host terminal screens defined by the screen definition information 6, and a process for compiling the application program source code 7 to generate online processing. When the online application program 9 prepared in this manner is executed, online application screens appear on the host terminal 14 connected with a communication line by way of a communication controller 4 and the communication means 3. The user utilizes these screens when carrying out tasks.

What follows is an online application processing system embodying the present invention. As mentioned above, the online application processing system of the invention develops a GUI processing program by using, without modifying, the online application program 9 prepared previously by a conventional online application processing system. Described below is how the screen definition information 6 is used for the program development.

Figure 1:
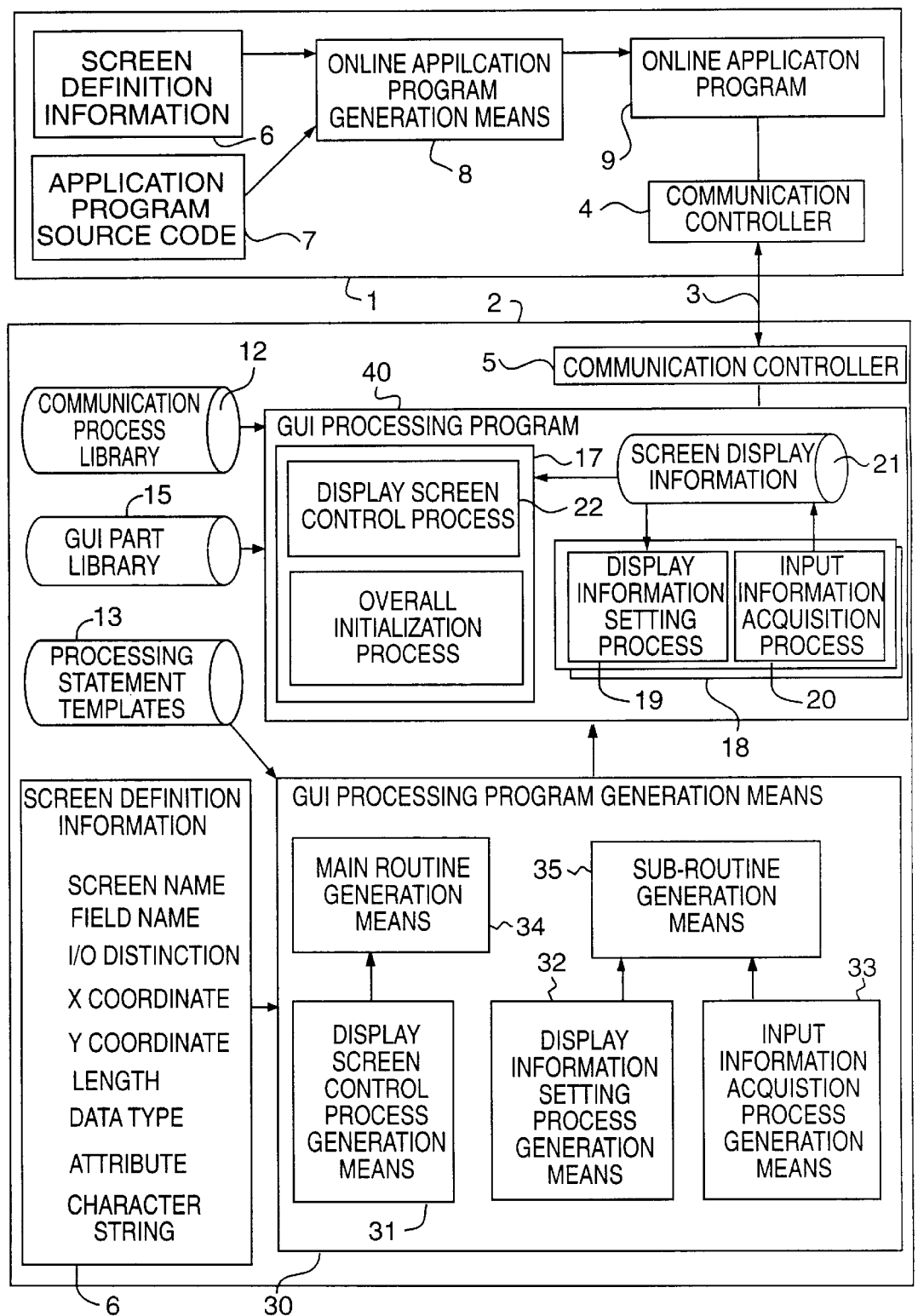
FIG. 1 is a block diagram of an online application processing system according to a first embodiment of the invention.

FIG. 1 is a block diagram of an online application processing system according to a first embodiment of the invention. In FIG. 1, a host computer 1 is shown connected to a computer 2 by way of communication means 3, which provides for the exchange of screen display data and screen input data between the host computer 1 and the computer 2. By way of example, computer 2 may be a personal computer or workstation. Since the major components of the host computer 1 are the same as those described with respect to host computer 1 shown in FIG. 2, further description of these components is made by reference to the description of FIG. 2.

Screen definition information 6 is furnished by copying to the computer 2 the screen definition information held in the host computer 1. The screen definition information 6 is described below in more detail with reference to FIG. 7. In FIG. 7, reference numeral 90 denotes the names of defined screens, and 91 represents the names of fields included in the screens. The names 90 and 91 serve as keys. Each row in FIG. 7 represents the definition of a single field in a given screen. Reference numeral 92 stands for an input-output distinction indicating whether the field in question is set for input or output. Reference numerals 93 and 94 are coordinates designating where fields are each located in their respective screens; 95 denotes the length of each field in which to display or input characters; 96 represents the type of data handled in each field; and 97 indicates an attribute of each field such as color and character size. In this example, the attributes define a color for each of the fields. Reference numeral 98 indicates a character string used only when the input-output distinction denotes a "fixed" field, the character string being displayed in a fixed manner.

Returning to FIG. 1, other components of the computer 2 are described below. Processing statement templates 13 describe in a piecemeal fashion the processing procedures of a GUI processing program 40 which acts as a host access program. The GUI processing program 40 is obtained by suitably combining processing statement templates 13 in accordance with the screen definition information 6 or by setting specific values such as coordinates from the screen definition information 6 into variables of the processing statement templates 13. This is how GUI processing program generation means 30 generates the GUI processing program 40.

The GUI processing program generation means 30 includes display screen control process generation means 31, display information setting process generation means 32, input information acquisition process generation means 33 and subroutine generation means 35. The display information setting process generation means 32 generates a display information setting process 19. The input information acquisition process generation means 33 generates an input information acquisition process 20. The subroutine generation means 35 combines the display information setting process 19 with the input information acquisition process 20 to create a subroutine 18 for each screen. The display screen control process generation means 31 generates a display screen control process 22. The display screen control process 22 is combined with an overall initialization process to generate a main routine 17.

The display information setting process generation means 32 generates the display information setting process 19 by utilizing the processing statement template 13 corresponding to the process in question. The processing statement template 13 contains routine processes for displaying screens based on screen display information 21. Because the screen display information 21 varies with screen contents, the screen definition information 6 is needed to analyze the screen display information 21 to provide appropriate display.

For that purpose, the display information setting process generation means 32 ascertains whether the field in question is set for screen display in accordance with the input-output distinction acquired from the screen definition information 6, and further verifies the coordinates, length and attribute of that field according to the information 6. In so doing, the display information setting process generation means 32 generates a process for displaying each field in the specified coordinates, length and attributes in a screen. Regarding fields in which to display character strings in a fixed fashion, the display information setting process generation means 32 generates a process for displaying the character string as designated by the screen definition information 6.

The GUI processing program 40 uses a GUI part library 15 to effect a GUI display. A process for calling the GUI part library 15 is included in a processing statement template 13. It is therefore the display information setting process 19 generated by the display information setting process generation means 32 that calls up the GUI part library 15. For example, where a character is to be displayed in a fixed fashion, that display is effected by use of GUI parts having no input function. For the processing of a task in which both character input and output are needed, the process for calling the GUI part library 15 is generated by designating in the processing statement template 13 a process for display that uses GUI parts having character input and edit functions.

Likewise, the input information acquisition process generation means 33 generates the input information acquisition process 20 by utilizing the processing statement template 13 corresponding to the process in question. Those portions that vary with screen contents are generated in accordance with the screen definition information 6. The input information acquisition process 20 is a process that acquires information input by the user of the GUI processing program 40 in the screen displayed by the display information setting process 19.

The subroutine generation means 35 generates a subroutine 18 by utilizing the processing statement template 13 corresponding to the subroutine in question. Within the subroutine 18, the display information setting process 19 is generated by embedding into the processing statement template 13 the process 19 generated by the display information setting process generation means 32, and the input information acquisition process 20 is generated by embedding into the processing statement template 13 that which is generated by the input information acquisition process generation means 33. The screen definition information 6 comprises definitions of a plurality of screens, and one subroutine 18 is needed for each screen. Thus the GUI processing program generation means 30 uses the subroutine generation means 35 repeatedly to generate the subroutines for all screens involved.

The display screen control process 22 is a process that calls a subroutine 18 corresponding to a given screen in accordance with the screen name included in the screen definition information 6. The display screen control process generation means 31 generates the display screen control process 22 by embedding, in the processing statement template of that process, a process for identifying the screen by use of the screen name obtained from the screen definition information 6. A main routine generation means 34 first generates an overall initialization process using the processing statement template 13 of the main routine 17. The overall initialization process is then combined with the display screen control process 22 generated by the display screen setting process generation means 32 so as to produce the main routine 17.

How the GUI processing program 40 works will now be described with reference to FIG. 1. The main routine 17 controls a communication controller 5 to receive transmitted data from the online application program 9, thereby obtaining screen display information 21. The process for receiving the data is carried out by a communication process library 12. A process for calling the communication process library 12 is included in the processing statement template of the main routine which was used by the main routine generation means 34. Given the screen display information 21, the main routine 17 uses the display screen control process 22 to call the subroutine corresponding to the screen in question in accordance with the screen name.

The display information setting process 19 in the called subroutine displays the screen. The input information acquisition process 20 handles user-input instructions regarding the displayed screen, thereby preparing screen display information to be transmitted to the online application program 9. The main routine 17 transmits the screen display information to the online application program 9. The process of information transmission to the online application program 9 is carried out by the communication process library 12. The process for calling the communication process library is included in the processing statement template of the main routine that was used by the main routine generation means 34. Thereafter, the above processes are performed repeatedly for recurrent data exchanges with the online application program 9, whereby screen displays together with the process of handling user-input instructions are repeated.

In the setup of the conventional online application processing system shown in FIG. 2, the host terminal 14 displays screens and accepts user-input instructions while exchanging data with the online application program 9. In the arrangement of FIG. 1, by contrast, the communication process library 12 is used to emulate the operation of the host terminal 14. This arrangement permits data exchanges with the online application program 9 that was primarily designed to operate by communicating with the host terminal 14. In addition, the display information setting process 19 provides the GUI environment by displaying a GUI screen through the use of the GUI part library 15.

The first embodiment of the invention will now be described in more detail with reference to FIGS. 1 through 13.

A typical online application used in connection with this embodiment is first outlined below. FIG. 3 is a view of a typical conventional screen displayed on a terminal by an online application program allowing employees to declare traveling expenses incurred on a business trip for reimbursement. In FIG. 3, reference numeral 80 represents a fixed field in which a character string "NAME" is always displayed; 81 is an output field for displaying the name of the employee who has made the business trip; and 82 is an input/output field into which the employee in question enters the necessary number for classification of the business expenses. Generally, a predetermined number is displayed automatically in the field 82 because each employee is assigned a fixed number for the category of traveling expenses except for a specifically defined business trip. The employee inputs his or her number if the business trip was a special case. Reference numeral 87 indicates an input field in which to input the actual amount of the expenses incurred. Having made necessary entries in the screen, the employee presses a key to indicate completion of data input. Given the data entered as outlined, the online application program 9 performs its task of settling the traveling expenses for the employee.

Figure 5:
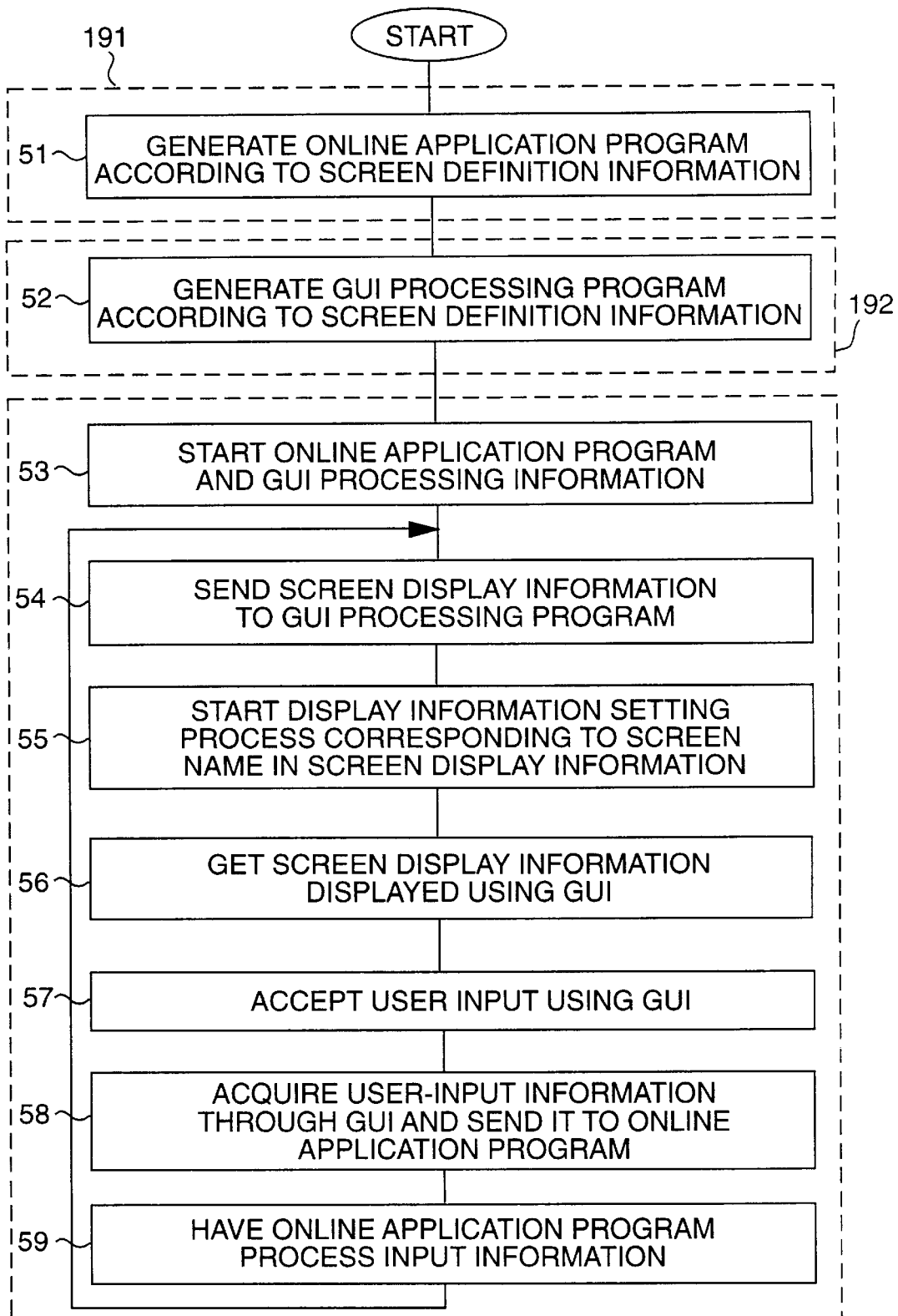
FIG. 5 is a flowchart of steps performed by the first embodiment of the invention.

What follows is a description of how the first embodiment of the invention works. FIG. 5 is a flowchart of steps performed by the online application processing system embodying the invention. In FIG. 5, the system first generates the online application program 9 in accordance with the screen definition information 6 (step 51). An example of screen definition information is shown in FIG. 7. The screen definition information comprises coordinates and data types regarding elements constituting screens. These kinds of information correspond to the individual elements of online application screens such as those shown in FIG. 3.

In accordance with the screen definition information, the system then generates a GUI processing program which acts as the host access program (step 52). The GUI processing program 40 is made up of one main routine 17 and at least one subroutine 18. Each of the subroutines 18 involved corresponds to a single online application screen.

It should be noted that step 51, step 52, and subsequent steps from 53 onward are chronologically separated from one another and are thus grouped respectively into divisions 191, 192 and 193 in FIG. 5 for convenience.

The online application processing system embodying the invention is intended to let a personal computer or other inexpensive terminal continuously utilize existing online application programs in the host computer without making modifications to these programs. Generally, an online application program was created initially for use with the conventional arrangement of FIG. 2. The application program is understood to generally have been run for some time by the setup of FIG. 2, before being applied to the processing by the inventive system (division 191).

For example, the online application program may have been created 10 years ago in division 191. Then, the generation of the GUI processing program 40 in division 192 is understood to take place at the present time. Step 53 and subsequent steps (in division 193) will later be carried out through the use of GUI.

Step 53 and subsequent steps in division 193 in FIG. 5 will now be described. The system starts both the online application program 9 in the host computer 1 and the GUI processing program generated in step 52 (step 53). The online application program 9 transmits screen display information to the GUI processing program 40 (step 54). The online application program 9 stores the received information 21 inside. The online application program 9 conventionally structured as shown in FIG. 2 is operated without being modified. This means that the screen display information transmitted by the online application program 9 via the communication means 3 in FIG. 1 has the same in contents as that of the setup in FIG. 2.

FIG. 8 shows the format of typical screen display information. In FIG. 8, reference numeral 130 indicates a screen name field. A field numbered 132 has a character "F" indicating that there follows data related to a fixed field. Fields 132 and 133 contain an X and a Y coordinate of the fixed field in question. A field 134 has a character string to be displayed that is fixed. In like manner, there follow further field type codes, X coordinates, Y coordinates and character strings. Reference numerals 135, 136 and 137 are an output field, an input/output field and an input field respectively. The input field has no character string data and is associated with coordinates only.

The system starts the display information setting process 19 corresponding to a given screen name in the screen display information (step 55), FIG. 5. The display information setting process 19 displays a GUI such as one shown in FIG. 4 in accordance with the remaining information in the screen display information 21 (step 56). In step 57, the system accepts user input. Step 57 is carried out by the GUI part library 15 in FIG. 1. When the user inputs data, the GUI part library 15 starts the input information acquisition process 20 corresponding to the currently processed online application screen. In step 58, the input information acquisition process 20 converts the user-input data to the format of the screen display information and transmits the converted data to the online application program 9. In step 59, the online application program 9 processes the input data.

In the steps described above, the system of the invention executes in unmodified fashion the existing online application program 9 that was generated by the online application program generation means 8 according to the screen definition information.

The GUI processing program generation means 30 uses the screen definition information to generate and carry out the process for setting and acquiring the screen display information 21 and the GUI screen such as the one shown in FIG. 4. This makes it possible for the system to display aesthetic, easy-to-use GUI screens such as that of FIG. 4 by effectively utilizing the existing online application program in the host computer.

Figure 6:
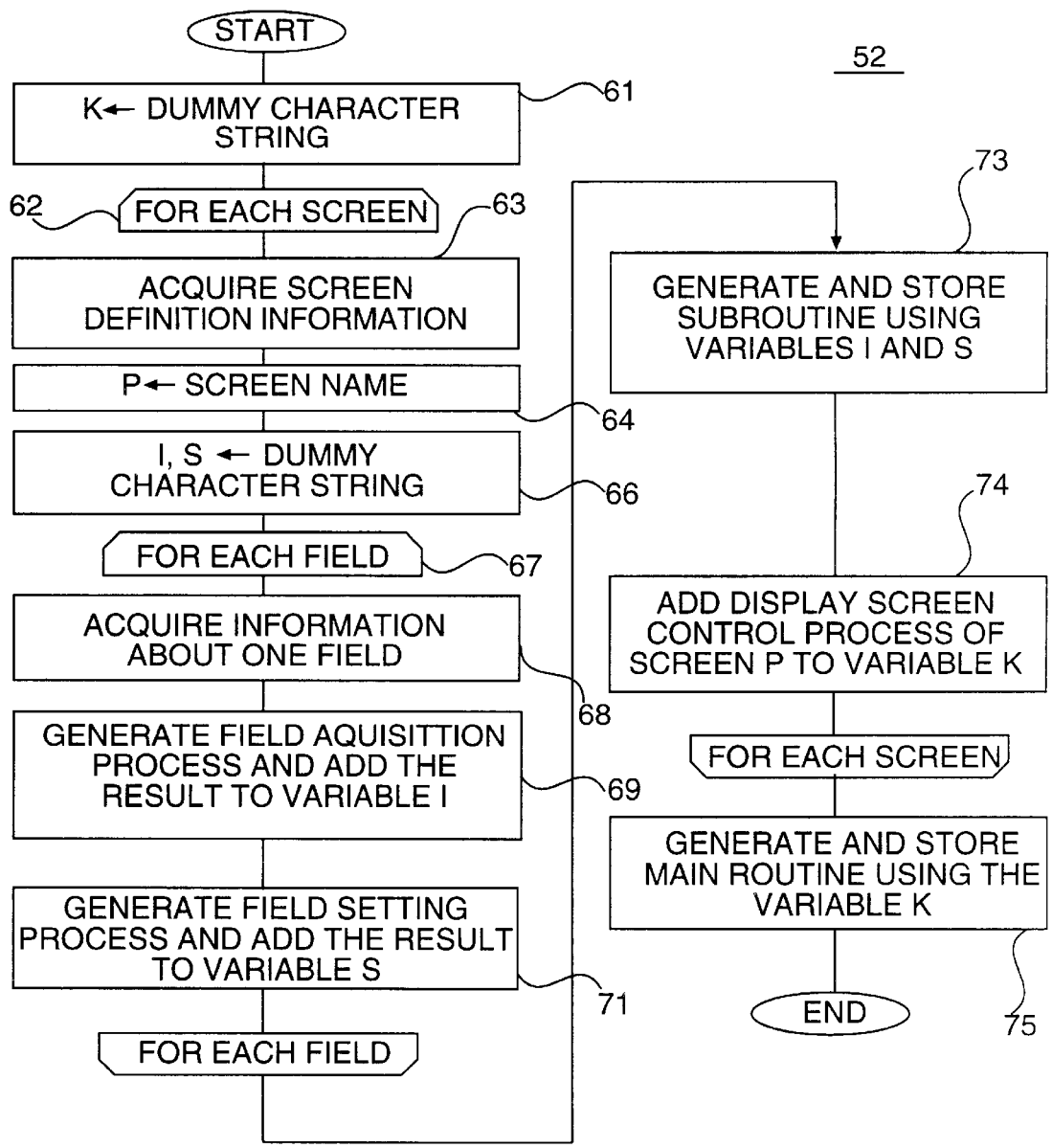
FIG. 6 is a flowchart of steps followed in the process of generating a host access program (step 52) of FIG. 5.

More details of step 52 (FIG. 5) will now be described with reference to FIG. 6. FIG. 6 is a flowchart of steps constituting the process for generating the GUI processing program according to the invention. In FIG. 6, a dummy character string is set to a variable K (step 61). The variable K is used in a subsequent step 75 for generating the display screen control process 22 of GUI processing program 40 shown in FIG. 1. The process 22 is used to execute step 55. One or a plurality of online application screens are processed in units of screens by repeating the preceding steps based on the screen definition information about each of the screens involved (step 62). Screen definition information for a given screen is then acquired (step 63). FIG. 7 is a diagram showing typical screen definition information. In FIG. 7 reference numeral 100 indicates a definition corresponding to the field 80 in FIG. 3. Specifically, in row 100, a character string field 98 defines a character string "NAME" equivalent to what is shown in the field 80 of FIG. 3.

Other items in FIG. 7 are described below with reference to FIGS. 3 and 7. Reference numeral 90 denotes the name of each screen defined. In this example, the screen names are the same because a single screen is being processed. Reference numeral 91 indicates the names of fields that appear in the screen. Each of the rows in FIG. 7 constitutes the definition of a given field in a given screen. Reference numeral 92 is an input-output distinction indicating whether the field in question is for input or for output. When the distinction is "FIXED," the field is a fixed field that always displays a predetermined character string; when the distinction is "OUTPUT," the field is an output field that displays information sent from the host computer; when the distinction is "INPUT," the field is an input field that sends the user-input data to the host; when the distinction is "I/O," the field is an input/output field which initially displays information sent from the host and then sends the user-input data to the host computer.

Reference numerals 93 and 94 are coordinates designating where the field in question is located in the screen. Reference numeral 95 denotes the length of each field in which to display or input characters, and 96 represents the type of data handled in the field. An entry "JAPANESE" in item 96 indicates that the field accommodates a Japanese character string; "ALPHANUMERIC" shows that the field accepts a character string composed of alphanumeric and symbolic characters; "NUMERIC" denotes that the field accommodates a character string made of numeric characters only. Reference numeral 97 indicates an attribute of the field such as color and character size. In this example, the attributes define colors for the fields. Reference numeral 98 indicates a character string used only when the input-output distinction is fixed, the character string being displayed in a fixed manner. Although screen names and field names may be constituted by a desired character string each, rules are generally established to regulate such wording.

In the example of FIG. 7, the leftmost characters AB in each screen name and field name make up an identification code common to the entire online application processing. The next character P stands for a screen name (P for picture) and F for a field name. The fourth character from left in each field name reflects the input-output distinction. Illustratively, character F stands for a fixed field and O for an output field. The remaining characters represent a different name for a different field.

Referring to FIG. 6, the screen name is then set to a variable P (step 64). A dummy character string is set to variables I and S (step 66). The variable I is used in a subsequent step 73 for generating the display information setting process 19, and the variable S is used in the same step 73 to generate the input information acquisition process 20.

The above steps are repeated to define each variable in the screen definition information (step 67). With the information about a given field acquired, the system sets a field name to the variable F, an input-output distinction to a variable FK, an X coordinate to a variable FX, a Y coordinate to a variable FY, a length to a variable FL, an attribute to a variable FA, and a character string to a variable FS (step 68). For example, a character string "ABFFNAME" is set to the variable F for the row 100 in FIG. 7.

A field setting process is then generated by acquiring a processing statement template 13 applicable to that process and by substituting suitable values for the variables in the template, the result of the generation being added to the variable I (step 69). Different templates of the field setting process are available for fields with different input-output distinctions. In this example, the template corresponding to the value in the variable FK is acquired. FIG. 10 is a view of a typical processing statement template 13 of the field setting process used for a fixed field. In FIG. 10, each part marked by symbol "$" represents a variable. For example, in the portion indicated by reference numeral 151, the part "$F" is replaced by the value "ABFFNAME" of the variable F to form a character string "f_ABFFNAME."

The result of the processing is shown in FIG. 9 in a portion 143. The portion 143 constitutes a program for displaying the character string "NAME" 110 in FIG. 4. The variable I accumulates the result of the processing from step 69 for all field definitions. Thereafter, as in step 69, a field acquisition process is generated by use of a processing statement template applicable to that process, and the result of the generation is added to the variable S (step 71).

Repeating the above steps causes the result of the processing on all field definitions to be accumulated in the variables I and S. After that, the subroutine is generated by acquiring a processing statement template 13 applicable to that subroutine and by substituting suitable values for the variables in the template as in step 69, and the resulting subroutine is stored (step 73).

FIG. 11 is a view of another typical processing statement template of a subroutine. The field setting process is set to a part 152 and the field acquisition process is placed in a part 153. The result of the subroutine generation is shown in FIG. 9, which is a subroutine written in C programming language. In FIG. 9, a portion 141 indicates a typical display information setting process 19 including the field setting process and a screen initialization process. A portion 142 represents a typical input information acquisition process 20 including the field acquisition process and other processes.

Figures 12, 13:
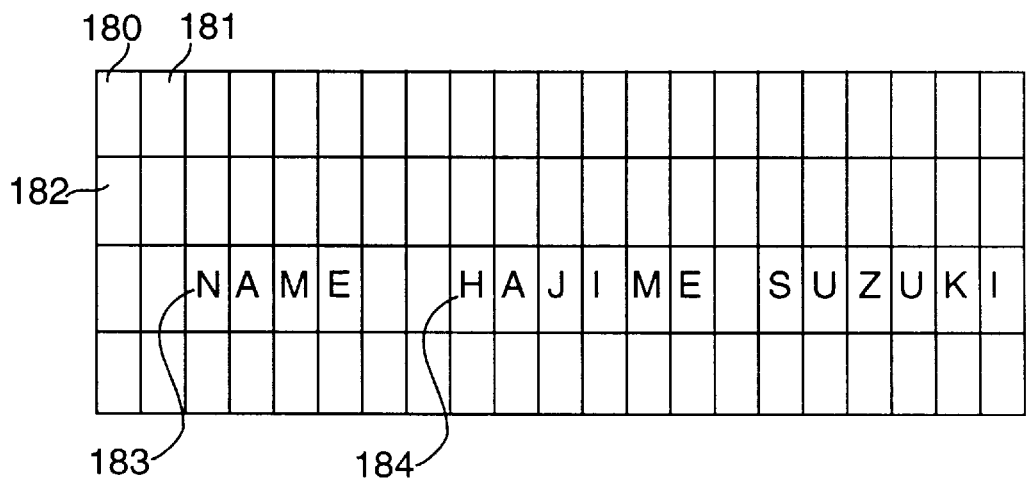
FIG. 12 is a diagram showing a portion of a typical main routine in the host access program generated in step 52.
FIG. 13 is a diagram of a typical storage structure of screen display information 21.

A display screen control process is then generated by acquiring a processing statement template 13 corresponding to that process and by substituting a suitable value for the variable P in the template, and the resulting process is added to the variable K (step 74). Because the screen name placed in the variable P is "ABP010," the display screen control process regarding that screen is added. In FIG. 12, a portion 154 constitutes the part to be added here to the variable K.

Repeating the above steps accumulates the result of the processing on all screens in the variable K. The resulting variable K is applied to the templates of a main routine to generate the main routine, and the generated main routine is stored (step 75). FIG. 12 is a diagram of part of a typical main routine generated in the manner described.

The above-described steps allow a GUI processing program to be automatically generated through the use of screen definition information. The GUI processing program thus prepared operates in communication with an online application program. The GUI part library 15 and the communication process library 12 for communicating with the online application program via the communication controller 5 compile the GUI processing program into an executable module which is then executed, whereby steps 54 through 59 are carried out.

Described below with reference to FIGS. 9 and 12 is how the program created in the above steps operates. In FIG. 12, the initialization process is carried out and the communication line is connected to the host computer (step 161). Step 161 is carried out by calling the communication process library 12 (FIG. 1). Screen display information is then received from the online application program and set to a variable "msg" (step 162). This step corresponds to step 54 (FIG. 5), constituting a reception process on the side of the GUI processing program. In a part "formSet," a screen name is acquired from the screen display information (step 163).

Referring to FIG. 8, a part 130 is acquired as a screen name. With the part 130 obtained, the display information setting process corresponding to the screen name in question is started. Since the screen name is "ABP010" as indicated in the part 130, a process indicated by reference numeral 154 in FIG. 12 activates a portion "w_ABP010_Set." Referring to FIG. 9, the screen display information is converted to memory format and stored in that format (step 164).

FIG. 13 is a diagram of a typical storage structure of the screen display information. In FIG. 13, individual regions make up a two-dimensional array corresponding to one-byte of data each.

For purpose of the description that follows, each of the regions making up the array is called an array variable G whose location is expressed by two suffixes. The first suffix represents the position counted from the top left origin in the rightward direction and the second suffix denotes the position counted in the downward direction. For example, a variable 180 in FIG. 13 is expressed as G(0, 0), a variable 181 as G(1, 0) and a variable 182 as G(0, 1). The elements of these two-dimensional array variables G are stored correspondingly to conventional online application screens such as the one shown in FIG. 3. This provides data format conversion between the online application program and the internal data format. Illustratively, with respect to parts 131 through 134 in FIG. 8, the character string "NAME" is displayed in coordinates (2, 2). In the memory of FIG. 13, the character string is stored illustratively in four-byte memory regions G(2, 2), G(2, 3), G(2, 4) and G(2, 5) indicated by reference numeral 183.

A window in which to display GUI is now initialized (step 165 in FIG. 9). Next to be initialized is a display GUI part for displaying the fixed character string defined in the row 100 of FIG. 7 (step 166). A function "labelCreate" is used to initialize the display GUI part. The character string "NAME" to be displayed fixedly is established next (step 167). A display color is then set according to the attribute 97 (step 168). Steps 166 through 168 above when carried out set up the GUI for a single field. This causes the GUI indicated by reference numeral 110 in FIG. 4 to be displayed.

The processing is repeated on each of other fields. It should be noted that the output field corresponding to a row 101 in FIG. 7 has a different character displayed every time the field is used anew. In such cases, the screen display information received from the online application program is acquired by referencing the variables G such as those shown in FIG. 13.

In the example of FIG. 13, a name "HAJIME SUZUKI" stored in variables from G(12, 2) as indicated by reference numeral 184 is acquired and established (step 169 in FIG. 9). A function "messageGet" acquires a character string by specifying its X coordinate in a first argument, its Y coordinate in a second argument and its length in a third argument. This function uses variables G to get the appropriate character string from within the screen display information received from the online application program 9. The input/output field corresponding to a row 102 in FIG. 7 requires both screen display and user input. Thus an input/output GUI is initialized (step 170). A function "textCreate" initializes an input/output GUI part. The input field corresponding to a row 103 is set for input alone and does not require the setting of display information.

A button-type GUI allowing the user to designate termination of input is initialized next. Settings are made so that pressing the button causes a process "w_ABP101_Get" to be started (step 171).

The processes above display the GUI screen of FIG. 4 when carried out.

The GUI part then receives user input and starts the process "w_ABP010_Get" when the button is pressed. A transfer number entered by the user into a field 112 in FIG. 4 is acquired (step 172). A function "textGetCaption" acquires the character string entered through the input/output GUI.

The entries are set to array variables G (step 173). A function "messageSet" sets the character string to the elements corresponding to the coordinates of the variables G. With this function, the character string to be acquired is specified in a first argument, its X coordinate in a second argument, its Y coordinate in a third argument and its length in a fourth argument.

Settings are made similarly to variables G for other input and input/output fields.

The screen display information is then acquired from the variables G and transmitted to the online application program (step 174). This step corresponds to step 58, constituting a transmission process on the side of the host access program. The GUI screen is then erased, and step 162 and subsequent steps are performed continuously (step 175).

As described, the steps above constitute the inventive online application processing allowing the application program 9, which was used by the conventional online application processing system of FIG. 2, to be operated by the user in unmodified fashion in a aesthetic, easy-to-use GUI environment as shown in FIG. 4.

Although the description above contains many specificities, these should not be construed as limiting the scope of the invention but as merely providing illustrations of the presently preferred embodiment of this invention. For example, the online application program 9 may be executed by a computer other than the host. Specifically, an online application program may be compiled again by a language compiler on a workstation and the program thus compiled may be run on that workstation. In such a case, the contents of the data communicated via the communication means 3 may differ in communication protocols but are equivalent in terms of meaning. Thus the invention may be readily applied to such a setup.

As described, the online application processing system according to the invention has the distinct advantage of providing aesthetic, easy-to-use GUI screen displays for online processing of an existing online application program in the host computer, with no modifications or additional programming made to that application program. For display purposes, the conventional host terminal is to be replaced by a graphics-ready computer such as a personal computer or a workstation, which is available today at very reasonable costs.

The host access program for displaying screens in GUI format takes advantage of the existing screen definition information that has been prepared during generation of the online application program in question. That is, no further effort is needed to define screens which, in this case, are created automatically from the existing screen definition information. In addition, the program for automatically generating the host access program using the screen definition information is commonly applied to varieties of existing online application programs in the host computer. Thus the program for automatic generation of the host access program, once created, may be shared among all such existing online application programs.

It is also possible to further modify the automatically generated host access program to supplement it with an error checking process for checking possible errors in the userinitiated input. When such an error checking process checks input errors without communicating with the host, the system operation is improved in its responsiveness. The process also relieves the host computer of the burden of an additional error check function.

Figure 14:
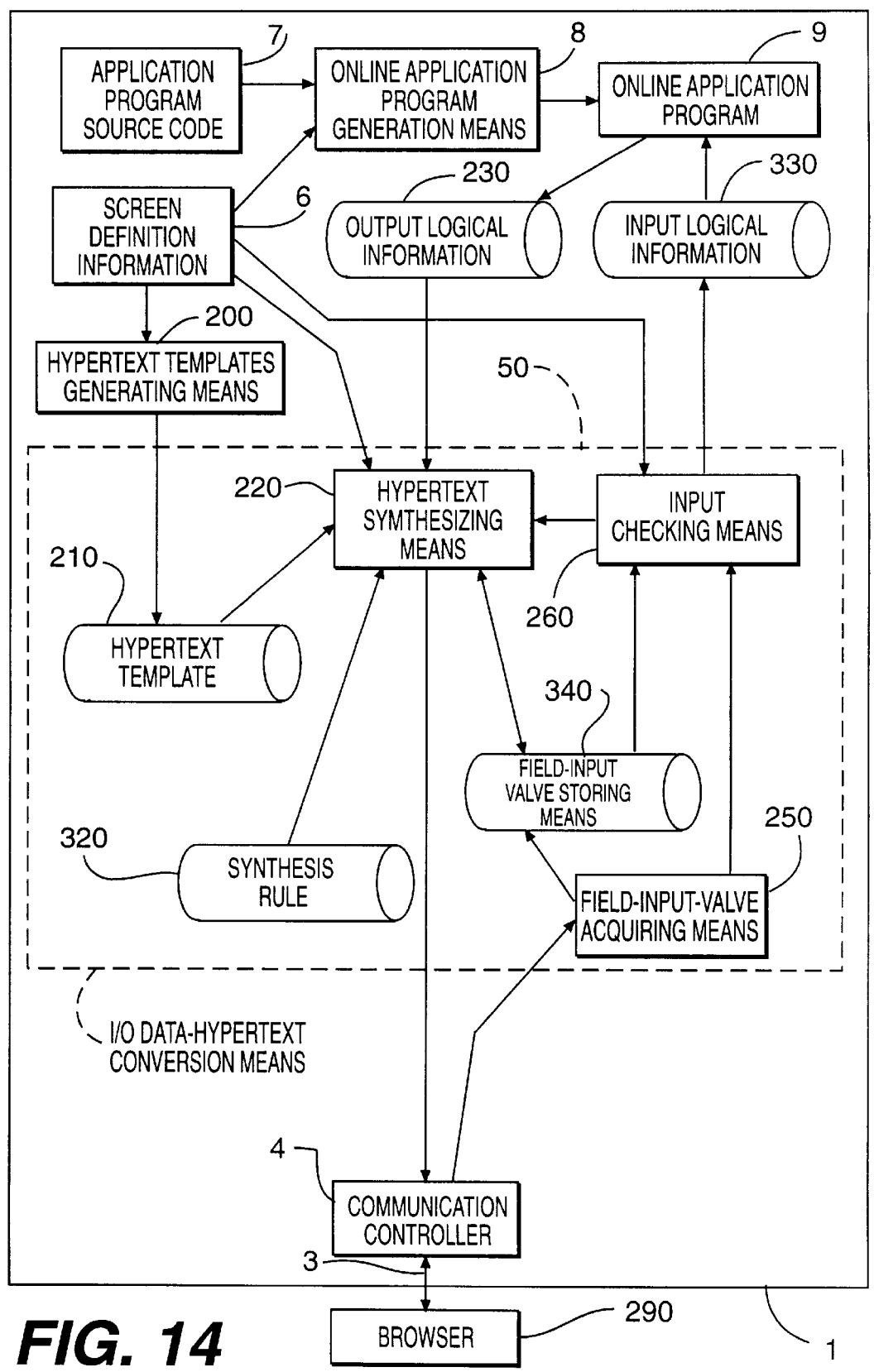
FIG. 14 is a block diagram showing a configuration of an online application processing system according to a second embodiment of the present invention.

FIG. 14 is a block diagram showing the configuration of an online application processing system according to another embodiment of the present invention. Reference numerals 1 and 290 shown in the figure are a host computer and a browser respectively. Reference numeral 3 is a communication means for transmitting data to be displayed as a screen from the host computer 1 to the browser 29 and input data entered by the user from the browser 29 to the host computer 1. As the browser 29, a personal computer or a workstation with a World Wide Web (WWW) browser installed therein can be used.

The elements of the host computer 1 are described as follows. Reference numerals 6 to 9 denote identical elements with the respective ones employed in the conventional online application processing system denoted by the same reference numerals in FIG. 15, meaning that the online application program 9 can be used as it is without any modifications. Reference numeral 50 is means for converting output logical information 230 and input logical information 330 output and information input by the online application program 6 into a hypertext and vice versa.

Briefly described, as used in this invention, hypertext is a technique that links information together. The linked information includes information indicating the location of another hypertext or other information. For example, information indicating a specific portion in one hypertext and a specific portion in another hypertext can be linked together by the portion in the one hypertext. A specified portion in the one hypertext is used to let a browser acquire information associated with the specified portion which indicates the location of another hypertext. The specified portion in the one hypertext also lets the browser acquire information associated with the specified portion which indicates a specific portion in the same hypertext. The information indicating the location of another hypertext is used to fetch the other hypertext and to change the display position thereof to the specific portion indicated by the acquired information. In this way, by merely carrying out a simple command operation on the browser, the user can display another text (information) related to a certain text (information), currently being displayed. In addition, a hypertext can link displayed information with information indicating the locations of elements such as a video data file, an audio data file, a dynamic-picture data file and a program with a certain portion in the same hypertext. FIG. 26 is a diagram showing an example of hypertext. In this example, a portion between texts 1301 and 1302 is associated with a program at a location indicated by information "/TR01/SID01/1: denoted by reference numeral 1303.

Hypertext can also be edited by using a dedicated editor. In particular, in the case of the WWW of the Internet described earlier, a HTML (Hypertext Markup Language) is provided for defining the syntax of a hypertext and is already used extensively world wide. Since the syntax is a standard of the Internet, a number of HTML editors are available, allowing the work on hypertext, such as editing and correction, to be carried out with ease.

The host computer 1 shown in FIG. 14 includes a number of elements explained by following a sequence of operations up to the display of a screen. Reference numeral 230 is output logical information, a result of online application processing produced by the online application program 9. FIG. 24 is a diagram showing an example of the output logical information 230 and FIG. 25 is a diagram showing another example of the output logical information 230. The example of in FIG. 24 shows that the name of the screen is "ABP010" and the value of each field is a blank. On the other hand, the example of output logical information 230 shown in FIG. 25 shows that the name of the screen is "ABP010" and the value of the field name "ABFEBUNR" is "MM" as indicated by reference numeral 1102 in the output logical information.

Figure 22:
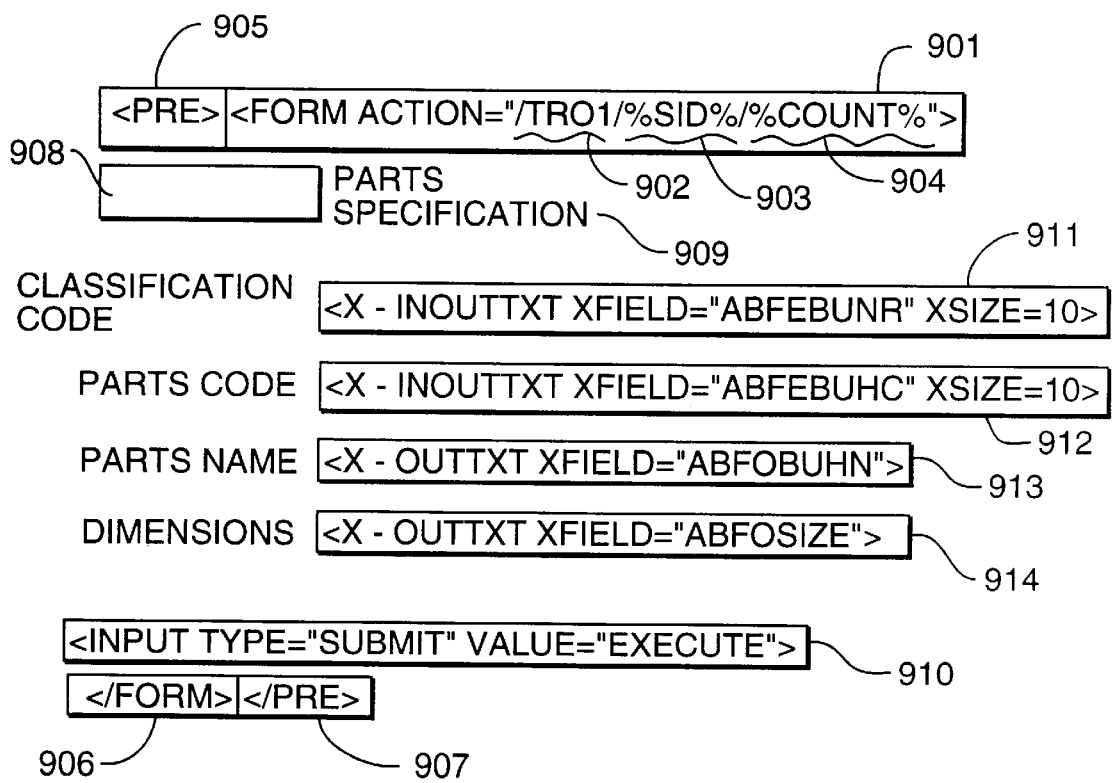
FIG. 22 is a diagram showing an example of a hypertext template.

With reference to FIG. 14, a hypertext template 210 is shown, which a model of the hypertext output as a result of a synthesis carried out by a hypertext synthesizing means 220. A hypertext template 210 is formed for each screen and identified by the name of the screen. FIG. 22 is a diagram showing an example of a hypertext template 210. Since a hypertext template includes marks for synthesis purposes that have the same syntax as the hypertext, it is possible to create and correct a hypertext template by means of an editor provided for hypertext templates.

Reference numeral 220 shown in FIG. 14 is the aforementioned hypertext synthesizing means for synthesizing a hypertext template 210 with output logical information 230 according to the synthesis rules 320. For example, when the example of the hypertext plate 210 shown in FIG. 22 is synthesized with the example of the output logical information 230 shown in FIG. 24 according to the examples of the synthesis rules 320 shown in FIG. 23, the hypertext synthesizing means 220 outputs the hypertext shown in FIG. 26. It should be noted that a portion denoted by reference numeral 1303 in the hypertext shown in FIG. 26 is a synthesis of the name of a transaction, a session ID and the number of times a hypertext has been output obtained from an access counter.

Communication controller 4 shown in FIG. 14 is for controlling communication with other equipment such as other computers, browser 29 and host terminal apparatuses 14 which are connected to the communication controller 4 by a communication means 3. The communication controller 4 starts communication with other equipment through the communication means 3 by commencing a communication session, a unit of communication management with other equipment. Inversely, the communication control means 4 ends the communication session in order to terminate the communication with the other equipment.

In the online application processing system shown in FIG. 14, a plurality of browsers can be connected to the host computer 1. Even in such a case, the communication means 3 serves as a communication means between the browsers 29 and the host computer 1. The communication control means 4 controls the exchange of data between the host computer 1 and the other equipment by using information held in the communication control means 4 to indicate which communication session incoming data pertains to and which browser data output in a communication session is to be transmitted.

Below is a description of the relation between the communication session and a transaction. A transaction is a unit used in executing online application (online job) processing. A transaction is started in order to commence online application processing and terminated at the end of the online application processing. A communication session is started at the beginning of communication between the host computer 1 and other equipment through the communication means 3. Thereafter, an exchange of data between the host computer 1 and other equipment is repeated. The communication session is terminated at the end of the communication. Normally, a transaction is started and terminated at the same time as a communication session is started and terminated. That is to say, a transaction is in a one-to-one relation with a communication session. In the case of the WWW used in the Internet described before, however, a communication protocol is adopted whereby a communication session is started and ended each time a screen is displayed. The present invention may be applied to the WWW used in the Internet. In this case, a transaction does not correspond to a communication session. Therefore, when a request for a next screen is received from a browser, the communication control apparatus 4 starts a new communication session. However, the communication control apparatus 4 cannot identify a transaction to which the new communication session corresponds by using only the information held in the communication control apparatus 4. Accordingly, when the present invention is applied to the WWW used in the Internet, a means for identifying a relation between a communication session and a transaction is required.

With the configuration elements described above, a transaction is started at a request made by a browser 29. The online application program 9 which begins its execution accompanying the starting of the transaction produces output logical information 230. Field values included in the output logical information are synthesized with a hypertext template 210 indicated by the name of a screen included in the output logical information 230 by the hypertext synthesizing means 220 and a result of the synthesis, that is, a hypertext, is transmitted to the browser 29. The browser 29 displays the hypertext received thereby typically as shown in FIG. 18.

Next, configuration elements composing the host computer 1 shown in FIG. 14 are explained by following a sequence of operations starting with an operation carried out by the user to enter inputs to a screen displayed on the browser 29 to the reception of the inputs by the online application program 9.

Figures 17, 18:
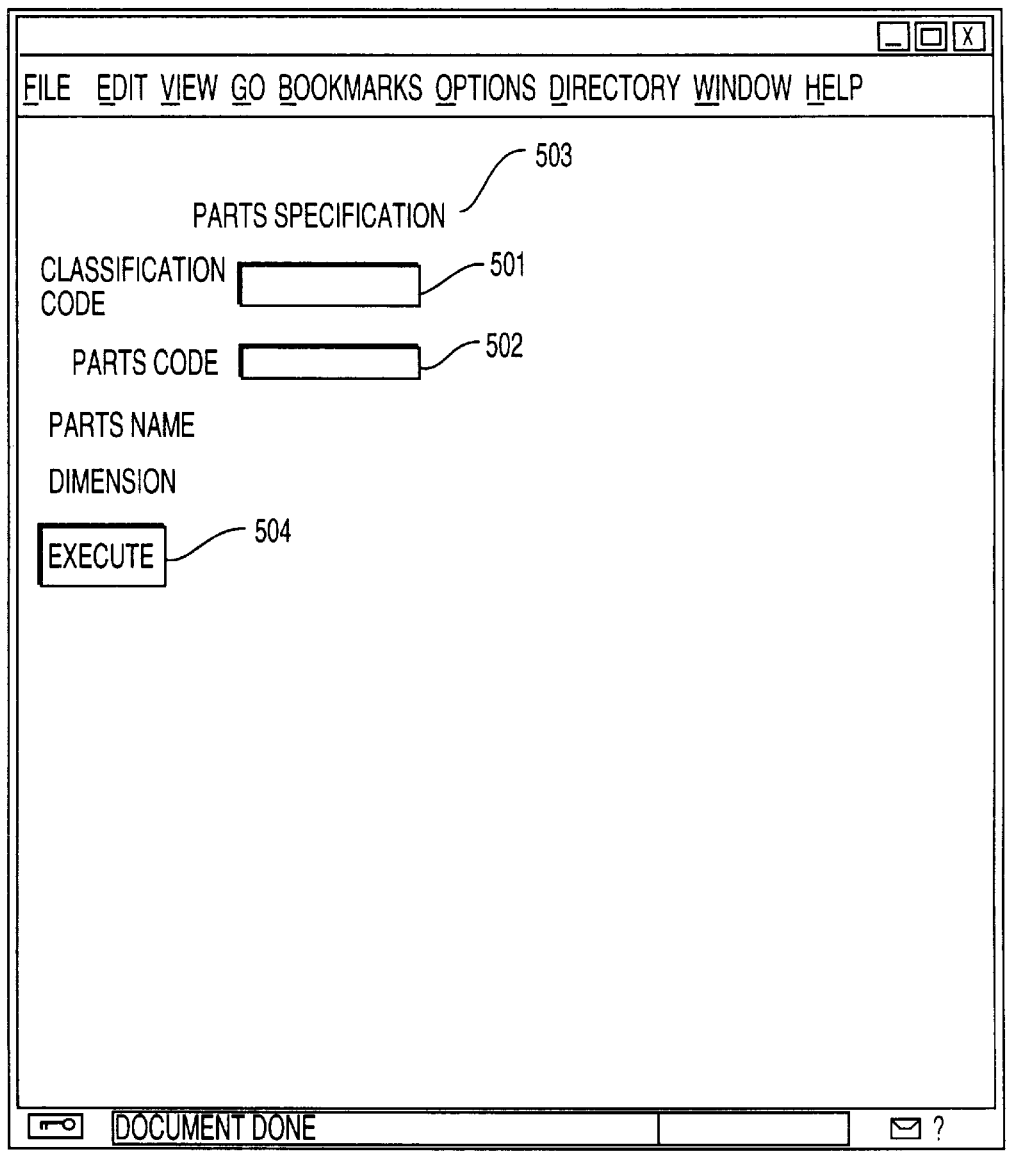
FIG. 17 is a diagram showing another example of a screen displayed by a conventional online application processing system.
FIG. 18 is a diagram showing an example of a screen displayed by a online application processing system according to the present invention.

FIG. 18 is a diagram showing an example of a screen displayed on the browser 29. Reference numeral 501 shown in this example is an area for entering a classification code and reference numeral 502 is an area for entering a part code. As the user enters inputs to these areas 501 and 502, the browser 29 transmits the input data to the host computer 1.

Reference numeral 250 shown in FIG. 14 is a field-input-value acquiring means for acquiring input values entered to input fields from the input data received from the browser 29 and storing the field values in a field-input-value storing means 340.

Reference numeral 260 shown in FIG. 14 is an input checking means for checking the values stored in the field-input-value storing means 340 with data types of the fields provided by the screen definition information 6. For example, the input checking means 260 verifies whether or not an alphabetical character is included in a numeric-type field or a Japanese or Chinese character is included in a field of the alphanumeric-character type. If a result of the checking operation indicates an error, the hypertext synthesizing means synthesizes a hypertext for an error screen and transmits it to the browser.

Reference numeral 330 shown in FIG. 14 is the input logical information cited above, data which is supplied to the online application program 9 when the result of the checking done by the input checking means 260 indicates that there is no error.

According to the above description of the configuration elements, the field-input-value acquiring means 250 acquires input values specified in the respective input fields from the input data entered by the user to a screen displayed on the browser 29 whereas the input checking means 260 verifies whether or not the input values correspond to their respective input fields. If no error is detected, the input data is supplied to the online application program 9.

Reference numeral 200 shown in FIG. 14 is a hypertext generating means for generating a hypertext template 210 in accordance with the screen definition information 6. An example of the screen definition information 6 is shown in FIG. 27. As shown in the figure, each entry line of the screen definition information 6 includes information on the name of a field, an input/output classification, an X coordinate, a Y coordinate, the length of the field and the type of the field value. It is thus possible to generate a hypertext template for displaying a screen according to the definition. The hypertext template can be corrected by using an editor for hypertexts after the generation. Therefore, first of all, a hypertext template is generated by using the hypertext template generating means 200. Then, the generated hypertext template is properly corrected by means of an editor for hypertexts if necessary to produce a final hypertext template.

Figures 15, 16:
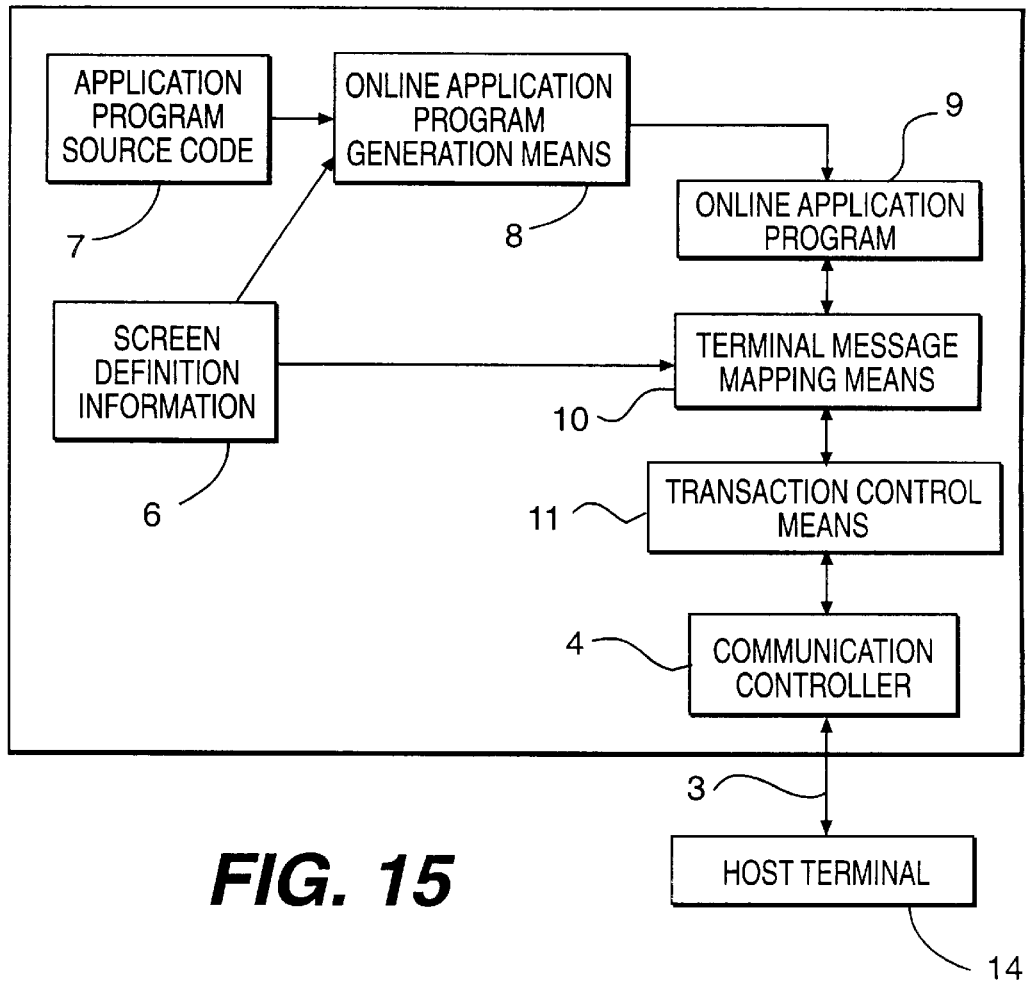
FIG. 15 is a block diagram showing the configuration of a conventional online application processing system.
FIG. 16 is a diagram showing an example of a screen displayed by a conventional online application processing system.

In the conventional configuration shown in FIG. 15, the terminal message mapping means 10 converts the format of data output by the online application program 9 into the form of control data for the host terminal apparatus 14. The host terminal apparatus 14 displays a screen in accordance with this control data. In case of the configuration of FIG. 14 provided by the present invention, on the other hand, while the online application program 9 is used as it is without any changes, a screen can also be displayed on the browser 29 which is used in place of the host terminal apparatus 14 because the hypertext synthesizing means 220 synthesizes a hypertext. Since the host terminal apparatus 14 is specially designed for use in conjunction with the host computer 1, the control data also has a special format. On the other hand, the browser 29 can be generally used to display information obtained not only from the host computer 1 but also from other computers. As a result, according to the present invention, the online application processing can be used for displaying data from other computers without the need to modify the online application program 9, offering merits such as the uniformity of the display means and displays based on the GUI.

Another embodiment of the present invention is explained as follows.

Figure 20:
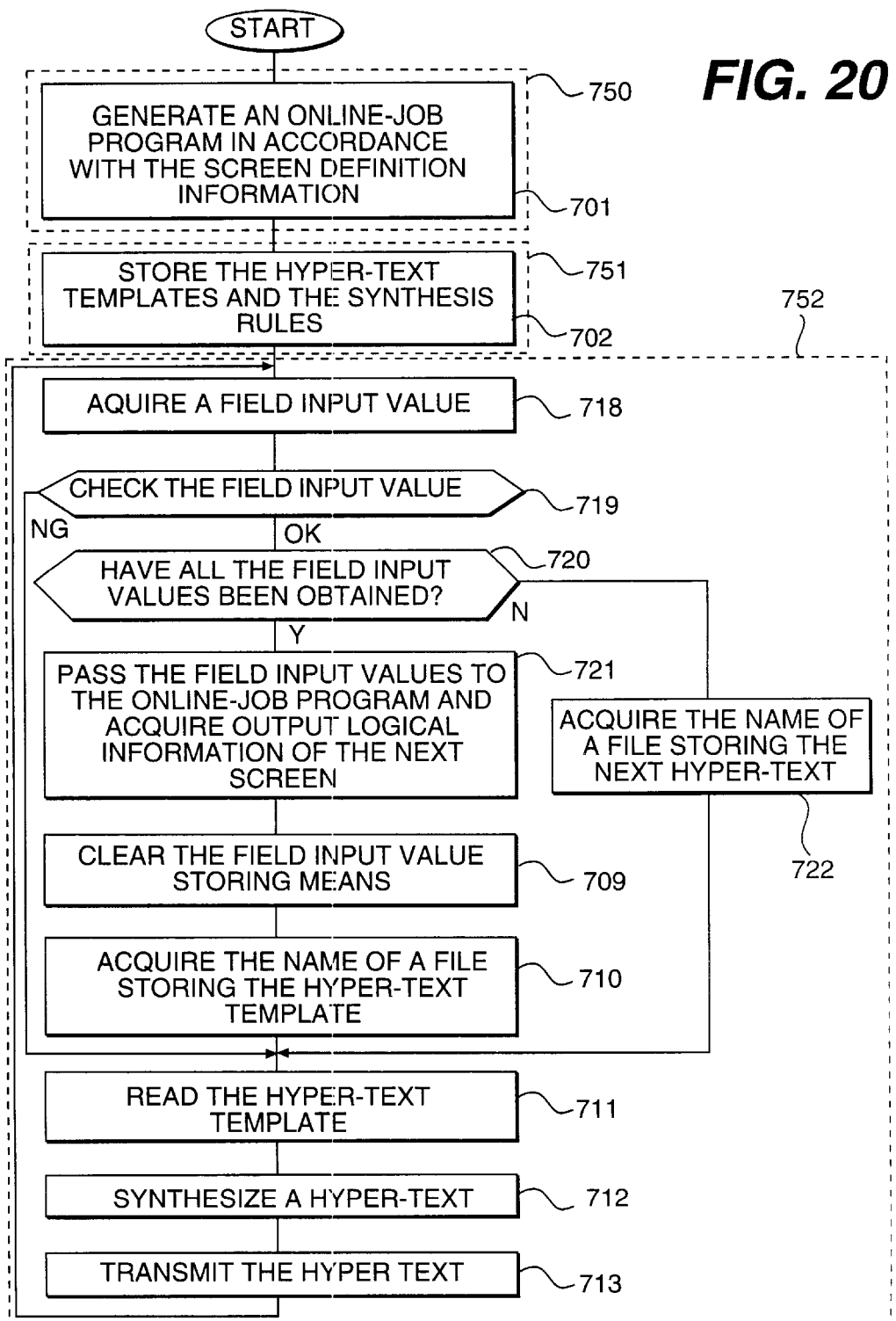
FIG. 20 is a schematic flow diagram showing a procedure of processing carried out by the online application processing system according to the present invention.

FIG. 20 is a schematic flow diagram showing the processing procedure adopted in the online application processing system according to the present invention. As shown in the figure, the processing flow begins with a step 701 at which the online application program generating means 8 generates an online application program 9 from the screen definition information 6 and the application program source 7. The application program source 7 describes the procedure of the online application processing in a programming language.

An example of the screen definition information 6 is shown in FIG. 27. As shown in the figure, the screen definition information includes information such as coordinates and the data type of each configuration element (or each field) of a screen. The configuration elements (that is, the fields) shown in FIG. 27 each correspond to a display element of an online application screen like the one shown in FIG. 16.

Reference numeral 1601 shown in FIG. 27 is the name of a transaction associated with a piece of online application processing. Reference numeral 1602 is the name of a screen for identifying the screen. Reference numeral 1603 is the name of a field for identifying each individual field on a screen. Each entry line of the screen definition information 6 shown in FIG. 27 defines a field on a screen. Reference numeral 1604 is an input/output classification of a field. The output/output classification may indicate that the field is a fixed, output, input or an input/output field. A fixed field always displays a predetermined fixed string of characters. An output field is used for outputting information transmitted from the host computer while an input6 field is used by the user for entering data to be transmitted to the host computer. Finally, an input/output field first displays information transmitted from the host computer and is then used by the user for entering data to be transmitted to the host computer.

Reference numerals 1605 and 1606 are the X and Y coordinates respectively of the position at which the field is to be displayed. Reference numeral 1607 is the length of the field indicating the number of characters including blanks that can be displayed by the online application program 9 or entered by the user.

Reference numeral 1608 is the type of displayed or entered data. A Japanese type indicates that data displayed or entered in the field is a string of Japanese characters and an alphameric character type indicates that data displayed or entered in the field is a string of alphabetical characters, numbers and symbols. A numeric type indicates that the data displayed or entered in the field is a string of numbers.

Applying only to a fixed field, reference numeral 1609 is a string of characters to be displayed in a field indicated by the input/output classification 1604 as a fixed field.

It should be noted that, even though any string of characters can be basically used as the name of a screen or the name of a field, the string of characters generally abides by a naming rule. For example, the first two characters 'AB' are used as the first two characters in all identification codes in the entire online application processing. The character 'P' or 'F' is used as a third one following the first two characters and indicates that the name is a screen name or field name, respectively. The fourth character in the name of a field indicates the input/output classification of the field. For example, the character 'F' or 'O' is used as a fourth one in the name of a field and indicates that the field is a fixed field or output field, respectively. The subsequent characters following the fourth one in the name of the field are used to distinguish the field from others.

Each item of an entry line of the screen definition information shown in FIG. 27 is explained as follows. As described before, each line of the screen definition information defines a field of a display screen. For example, according to items 1601 and 1602 on a line 1610, it is obvious that the name transaction of a transaction and the name of a display screen for a field on the screen represented by the line 1610 are 'TR01' and 'APB010' respectively. The items described on the line 1610 are the definition of a field 503 of the screen shown in FIG. 18. According to an item 1603, the field name is 'ABFFTITL'. According to an item 1604, the input/output classification of the field, this field is a fixed field to which a predetermined fixed string is output. The string of characters is defined by an item 1609 as 'Parts Specifications', a string of characters displayed in the field 503 of the screen shown in FIG. 18. According to an item 1608, the type of data is Japanese and, according to items 1605 and 1606, the X and Y coordinates are (10, 2). According to an item 1607, the length of the character string is eight characters. To be more accurate, the length is eight alphameric characters. Since the length of a Japanese character is two alphameric characters, even though the string of Japanese characters meaning 'Part Specifications' comprises only four Japanese characters, the length thereof is eight alphameric characters.

At the step 701 of the processing flow shown in FIG. 20, data formats of the output logical information 230 and the input logical information 330 are found in accordance with the screen definition table 6 and an online application program 9 is then generated with the data formats taken into consideration. FIGS. 24 and 25 are each a diagram showing an example of the output logical information 230 produced by the online application program 9. Pieces of information in the output logical information 230 that are output by the online application program 9 are each displayed in a field of the screen defined by the input/output classification 1604 thereof as an output or input/output field. In the screen definition information 6 shown in FIG. 27, such fields are defined by lines 1612, 1614, 1616 and 1618 which correspond to field names 1102, 1103, 1104 and 1105, respectively, of the output logical information shown in FIGS. 24 and 25. As for the input logical information 330, pieces of information are each entered by the user to a field of the screen defined by the input/output classification 1604 thereof as an input or input/output field. In the screen definition information 6 shown in FIG. 27, such fields are defined by lines 1612 and 1614. The processing logic of the job program source 7 which is translated into the online application program 9 describes which screen is to be displayed next. Therefore, the input logical information does not include the name of any screen.

FIG. 32 is a diagram showing an example of the input logical information. Fields 2501 and 2502 shown in FIG. 32 correspond to items 1612 and 1614 of the screen definition information shown in FIG. 27. Reference numerals 2503 and 2504 shown in FIG. 32 are examples of input values entered to the fields 2501 and 2502, respectively.

The processing flow shown in FIG. 20 then goes on to a step 702 at which hypertext templates 210 and synthesis rules 320 are stored.

FIG. 22 is a diagram showing an example of the hypertext template 210. The example shown in the figure is a hypertext template 210 of a screen with a name 'ABP010' associated with a transaction having a name 'TR01' shown in FIG. 27.

In FIG. 22, an item starting with the symbol '<' is a command regarding how to display a hypertext issued to a browser 29 or a command regarding the synthesis method issued to the hypertext synthesizing means 220. Non-command items are to be displayed as they are. For example, a '<PRE>' item 905 of the hypertext template is a command requesting the browser 29 not to ignore a blank in the hypertext. According to this '<PRE>' command 905 of the hypertext template, blanks 908 having a length of 10 alphameric characters are to be displayed as they are and to be followed by a string of characters 'Part Specifications, denoted by reference numeral 909. A '</PRE>' item 907 is the counterpart command of the '<PRE>' command 905 which indicates the end of the '<PRE>' command 905.

By the same token, a command 901 of the hypertext template starting with '<FORM' is ended by its counterpart command 906 starting with '</FORM>'. The command 901 starting with '<FORM' indicates that a text sandwiched by the command 901 and the counterpart command 906 is to be associated with another program or data.

An item sandwiched by two characters '%' is a command regarding a hypertext to be synthesized. Such a command is issued to the hypertext synthesizing means 220. For example, a '%SID%' command 903 of the hypertext template makes a request to the hypertext synthesizing means 22 that a session ID be embedded at the location occupied by this command. On the other hand, a '%COUNT%' command 904 of the hypertext template makes a request to the hypertext synthesizing means 220 that an access count be embedded at the location occupied by this command.

An item 910 of the hypertext template starting with the symbol '<' is a command requesting that a button GUI be displayed on a browser. The button GUI is used by the user to request that inputs be transmitted to the other program or data associated by the command 901 and to request that a next screen be displayed.

Figure 23:
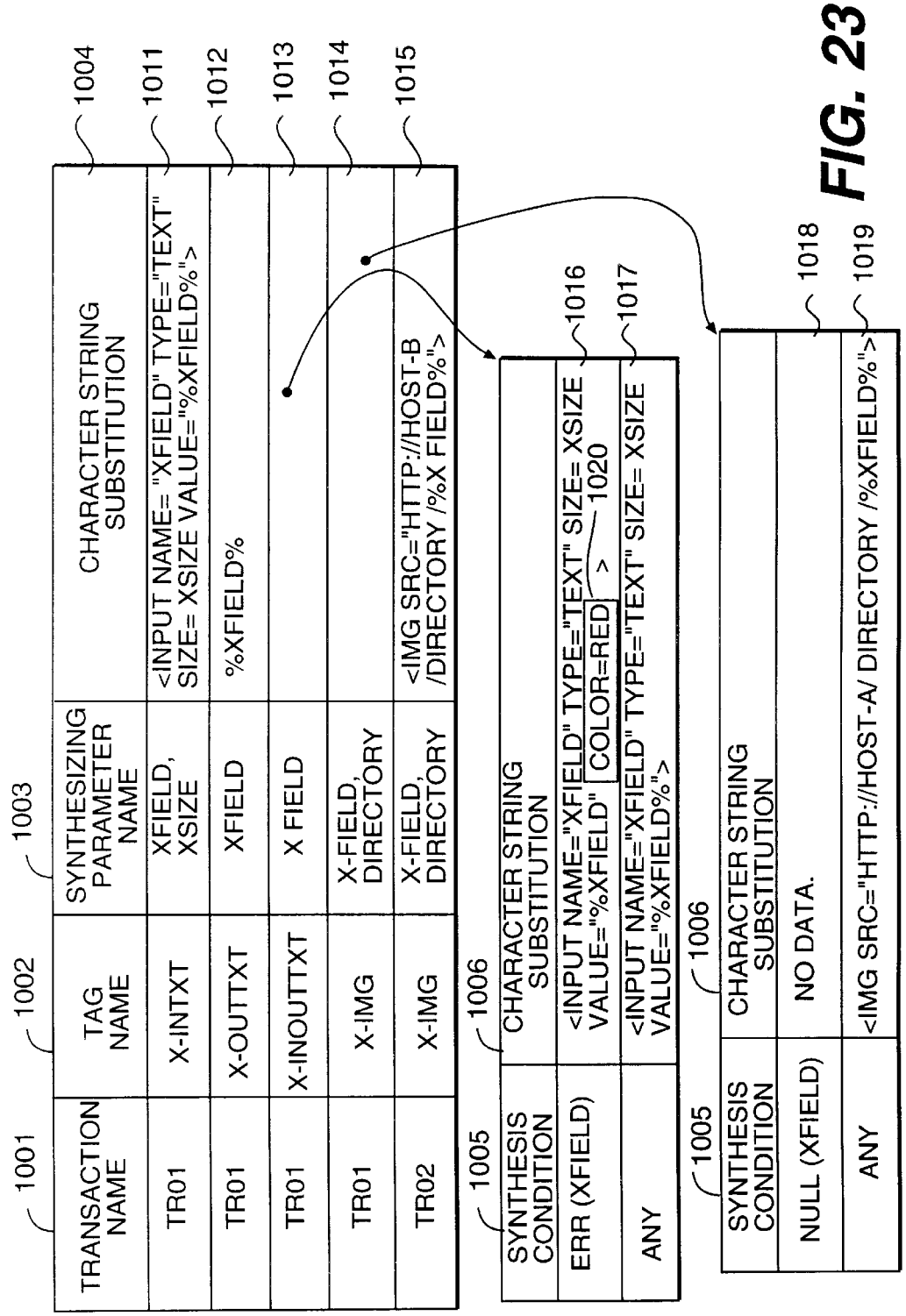
FIG. 23 is a diagram showing an example of synthesis rules.

FIG. 23 is a diagram showing examples of the synthesis rules 320. Each entry line in the figure is used to describe a synthesis rule. An entry field 1001 shown in the figure is used to describe the name of a transaction associated with the synthesis rule. An entry field 1002 is used to describe the name of a tag in a hypertext template 210 requiring the application of the synthesis rule. For example, in the hypertext template 210 shown in FIG. 22, the tag name 'X-INOUTTXT' is described in items 911 and 912 of the hypertext template. By the way, the tag name 'X-INOUTTXT' is also described on an entry line 1103 of the synthesis rules shown in FIG. 23. Therefore, a synthesis rule pointed to by a pointer described in an entry field 1004 on the entry line 1013 is applied to the items 911 and 912 at a step 711 of the processing carried out the online application program shown FIG. 20 to be described later.

Likewise, in the hypertext template 210 shown in FIG. 22, the tag name 'X-OUTTXT' is described in items 913 and 914 and also described in the entry field 1002 on an entry line 1012 of the synthesis rules shown in FIG. 23. by the same token, the synthesis rule described on the entry line 1012 is applied to the items 913 and 914 at the step 711.

An entry field 1003 of the synthesis rules describes the names of synthesis parameters for which synthesis-parameter values are to be substituted in the application of the synthesis rule if these synthesis parameters are specified in the hypertext template 210. For example, in the case of the entry line 1011, synthesis-parameter names 'XFIELD' and 'XSIZE' are described. Since these synthesis-parameter names 'XFIELD' and 'XSIZE' are also specified in a tag 911 of the hypertext template 210, values of these synthesis parameters are substituted for these synthesis-parameter names 'XFIELD' and 'XSIZE' in the application of a synthesis rule. That is, 'ABFEBUNR' and '10' are substituted for the synthesis-parameter names 'XFIELD' and 'XSIZE' respectively.

The entry field 1004 of the synthesis rules is a substitution character string to be synthesized with the hypertext template 210 to produce a hypertext, a result of applying a synthesis rule. For example, the entry field 1004 on the entry line 1011 of the synthesis rules specifies a substitution character string '<INPUT NAME="XFIELD" TYPE="TEXT" SIZE=XSIZE VALUE="%XFIELD%">'. A substitution character string, to which a synthesis rule is to be applied, indicates character strings for which synthesis parameters are to be substituted. That is to say, the synthesis parameters are substituted for character strings in the substitution character string that match the names of parameters specified in the entry field 1003 of the synthesis rules. By the way, some character strings in the substitution character strings match 'XFIELD' and 'XSIZE', the names of parameters described in the entry field 1003 of the synthesis rules which are also specified in the hypertext template 210 shown in FIG. 22. Therefore, in the case of the tag 911 of the hypertext template 210, applying the synthesis rule results in '<INPUT NAME="ABFEBUNR" TYPE="TEXT" SIZE=10 VALUE="%ABFEBUNR%">'.

Unlike the entry field 1004 on the entry line 1011 of the synthesis rules which specifies a substitution character string as described above, the entry field 1004 on the entry line 1013 of the synthesis rules is a pointer to other substitution character strings to which a synthesis rule is to be applied only if a synthesis condition is met.

In an entry line of the synthesis rules, an entry field 1005 shows a synthesis condition and an entry field 1006 is a substitution character string indicating character strings for which values are to be substituted if the synthesis condition 1005 is satisfied. For example, according to the entry line 1016, if an input error is detected in a synthesis parameter 'XFIELD' specified in the synthesis condition in the entry field 1005, a substitution character string '<INPUT NAME="XFIELD" TYPE="TEXT" SIZE=XSIZE VALUE="%XFIELD%" COLOR=RED>' described in the entry field 1006 is an object of substitution. Otherwise, a substitution character string '<INPUT NAME="XFIELD" TYPE="TEXT" SIZE=XSIZE VALUE="%XFIELD%">' described in the entry field 1006 on the entry line 1017 is the object of substitution since the work 'ANY' is described in the entry field 1005. It should be noted that the work 'ERR' of the synthesis condition described in the entry field 1.005 indicates that the clause "if an error is detected in the field following the work 'ERR'" is used as a synthesis condition. On the other hand, the work 'ANY' means that there are no applicable conditions. As for the synthesis condition on the entry line 1018, the word 'NULL' indicates that the clause "if the field following the word 'NULL' contains blanks" is used as a synthesis condition.

The discussion returns to the processing procedure of FIG. 20 adopted in the online application processing system. As shown in the figure, the processing procedure comprises three parts 750, 751 and 752 to be described below. These parts are separated chronologically by big intervals, as follows. Since the present invention allows an existing online application program executed on a mainframe computer to be continuously utilized as it is without the need to modify the program from a terminal known as a browser implemented by a low-cost computer such as a personal computer, the online application program 9 is understood to have been created to be used in a configuration shown in FIG. 15 at some earlier time. After the online application processing has been implemented in the configuration shown in FIG. 15 for a while, it is understood that implementation at the present invention is intended. Therefore, the part 750 is understood to have been executed at any time to create the online application program 9 and the part 751 is understood to be carried out at a stage for preparing the present invention. The parts 750 and 751 are executed only once. On the other hand, the part 752 is performed repeatedly at an operation stage of the online application processing system. That is to say, each time online application processing is carried out, the part 752 is executed. For example, the online application program can be understood as having been created by using the part 750, say, 10 years ago where as a host access program 40 may have been just created by using the part 751. Thereafter, the processing of the part 752 is carried out repeatedly by operating the browser 29 in order to perform online application processing. As such, the three parts 750, 751 and 752 are separated chronologically from each other by big intervals.

The processing procedure of the part 752 begins with step 718 at which the field input values are acquired. The field input values in this request are 'MM' and 'MM3X10' described on lines 2402 and 2403 respectively.

The processing flow then proceeds to a step 719 at which the field input values are checked against the type of the fields defined in the screen definition information 6 shown in FIG. 27. According to the entry lines 1612 and 1614 of the screen definition information 6, the types of the fields are both an alphameric type. The types of the field input values are thus found to be a correct match (OK).

If an error is found at the step 719, i.e. the match is no good (NG), the steps of the processing carried out in steps 711 to 713 and 718 are repeated to synthesize and transmit a hypertext again. Let an error be detected in the field 'ABFEBUNR'. In the case, during the processing to synthesize the hypertext at the step 712, the synthesis rules shown in FIG. 23 are searched at the step 804 for a synthesis rule applicable to the tag 911 of the hypertext template shown in FIG. 22 which contains 'ABFEBNUNR'. Since the tag 911 includes the tag name 'X-INOUTTXT', the result of the search is that the entry line 1013 of the synthesis rules shown in FIG. 23 includes a pointer pointing to the entry lines 1016 and 1017. Since an error is detected, however, the entry line 1016 is applicable. According to the entry line 1016 the synthesis condition 1005 is 'ERR (XFIELD)'. According to the tag 911, the value of the synthesis parameter 'XFIELD' is 'ABFRBUNR'. Thus, the synthesis condition 'ERR (XFIELD)' is equivalent to 'ERR (ABFEBUNR)' which implies a clause stating: "If there is an error in the field 'ABFEBUNR'." Since there is an error in the field 'ABFEBUNR', this synthesis condition is satisfied. As a result, the synthesis rule 1020 described on the entry line 1016 shown in FIG. 23 is followed. The browser then displays the field in which an error was detected in a red color in accordance with this synthesis rule. As a result, the user can recognize the location of the error with ease.

If no error in the match is found at the step 719 (OK), on the other hand, the processing flow goes on to a step 720 to find out whether or not all field values have been received. According to the screen definition information 6 shown in FIG. 27, the screen 'APB010' of the transaction 'TR01' currently being executed has two input/output fields on the entry lines 1612 and 1614 and, according to the request shown in FIG. 31, values are entered to the lines 2402 and 2403. Accordingly, all field values are determined to have been received.

Since all field values have been received, the processing flow proceeds to a step 721 at which the field input values are passed to the online application program and output logical information 230 for the requested next screen is acquired. FIG. 32 is a diagram showing an example of the input logical information 330 passed to the online application program. Items 2503 and 2504 of the input logical information are obtained from the lines 2402 and 2403 of the request for a hypertext respectively. In accordance with a classification code and a part code provided as shown in FIG. 32, the online application program includes detailed data of the part like the one shown in FIG. 25 in the output logical information 230. The flow of the online application processing shown in FIG. 20 then proceeds to a step 709 at which the field input value storing means 340 is cleared. Then, the processing flow goes on to a step 710 at which the name of a file containing the hypertext template is acquired.

Figure 21:
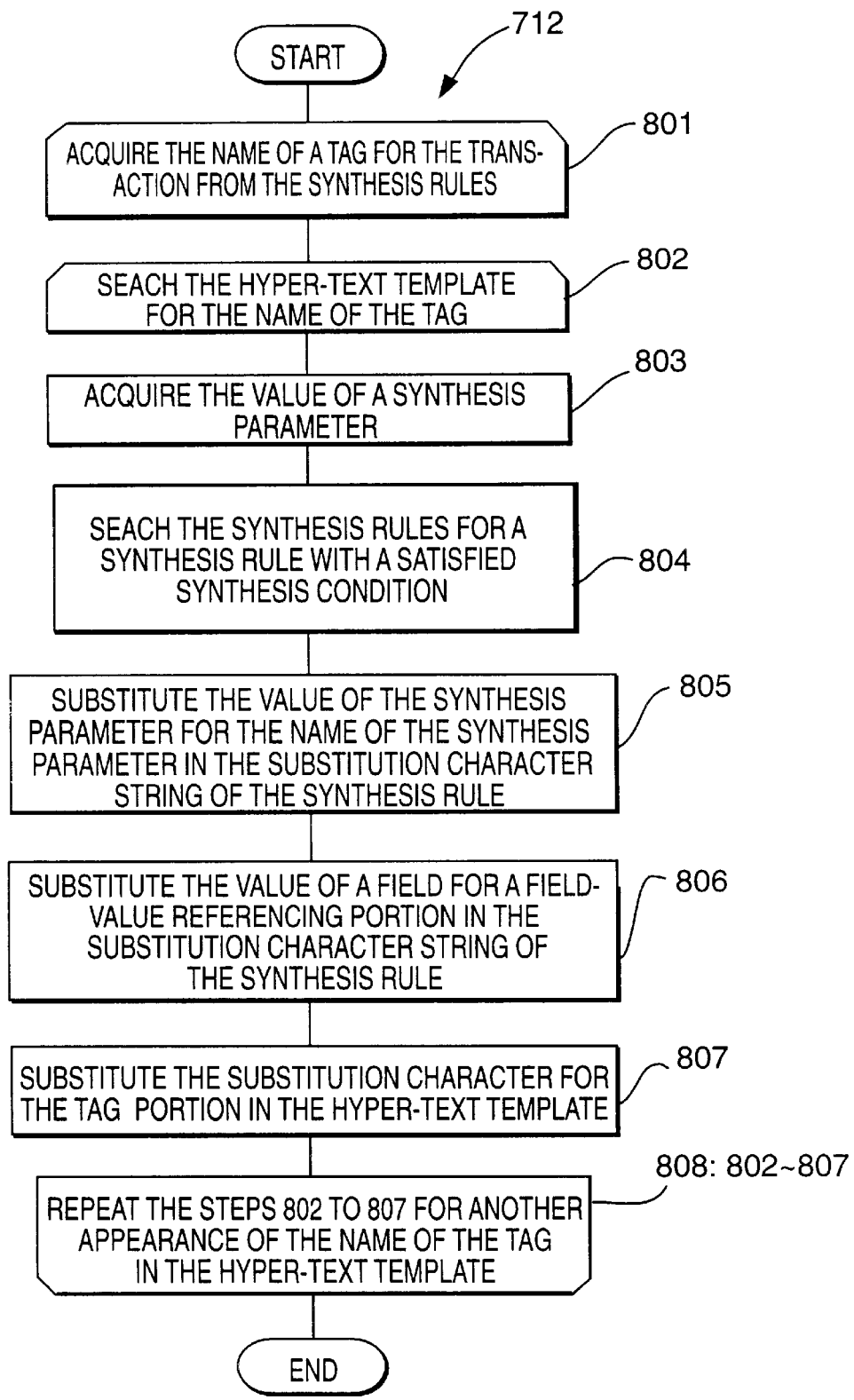
FIG. 21 is a schematic flow diagram showing a detailed procedure of processing carried out in a step 712 of the processing procedure shown in FIG. 20.

The file containing the hypertext template is read after the transaction and the screen. For example, if the name of the transaction is 'TR01' and the name of the screen is 'ABP010', then the name of the file is 'TR01.ABP010'. The processing flow then continues to a step 711 at which the hypertext template is read in from the file. FIG. 22 is a diagram showing an example of the hypertext template read in from a file named 'TR01.ABP010'. Finally, the processing flow goes on to a step 712 at which a hypertext is synthesized. FIG. 21 is a schematic flow diagram showing in detail the hypertext synthesizing processing carried out at the step 712.

As shown in FIG. 21, the flow of the hypertext synthesizing processing starts with a step 801 at which the name of a tag for the transaction 'TR01' is acquired from the synthesis rules 320 shown in FIG. 23. Processing steps are then carried out at steps 802 to 808, which are repeated for all appearances of the acquired tag name in the hypertext template shown in FIG. 22.

Let the tag name 'X-INTXT' be initially acquired from the synthesis rules at the step 801. The processing flow then goes on to a step 802 at which the hypertext template shown in FIG. 22 is searched for the tag name 'X-INTXT'. Since the hypertext template does not contain the tag name 'X-INTXT', the processing flow returns to the step 801, the tag name 'X-OUTTXT' on the entry line 1012 is acquired from the synthesis rules shown in FIG. 23 this time. As a result of searching the hypertext template at the step 802, the tag name 'X-OUTTXT' is found in the tag 913. The processing flow then goes on to a step 803 to acquire the value of a synthesis parameter. According to the tag 913 of the hypertext template shown in FIG. 22, the value of the synthesis parameter named 'XFIELD' is 'ABFOBUHN'.

The processing flow of FIG. 21 then proceeds to a step 804 at which the entry line 1012 of the synthesis rules is searched for a synthesis condition which must be satisfied in order to apply a synthesis rule. However, the entry line 1012 of the synthesis rules shown in FIG. 23 does not contain a pointer pointing to a synthesis condition. The processing flow then goes on to a step 805 at which the value of the synthesis parameter described in the hypertext template is substituted for the name of the synthesis parameter in the substitution character string described in the synthesis rules. According to the entry line 1012 of the synthesis rules shown in FIG. 23, the name of the synthesis parameter 1003 is 'XFIELD' and the substitution character string 1004 is '%XFIELD%'. The value of the synthesis parameter 'XFIELD' is 'ABFOBUHN' described in the tag 913 of the hypertext template shown in FIG. 22. Thus, the value of the synthesis parameter 'ABFOBUHN' is substituted for the portion 'XFIELD' in '%XFIELD%' to result in '%ABFOBUHN%' in the substitution character string.

Then, the processing flow of FIG. 21 goes on to a step 806 at which the value of a field is substituted for a field-value referencing portion in the substitution character string. If a portion in the substitution character string sandwiched by characters '%' is the name of a field included in the output logical information 230 shown in FIG. 24 as is the case with '%ABFOBUHN%', the portion is a field-value referencing portion which indicates that the value of the field be referenced. According to the output logical information 230 shown in FIG. 24, the value of the field for the field name 'ABFOBUHN' described in the portion '%ABFOBUHN%' is a string of blank characters. Thus, the final result of the substitution will be a string of blank characters in the hypertext shown in FIG. 26. It should be noted that the online application program 9 outputs character strings each having a specified length to the output logical information 230 in accordance with the screen definition information 6. In this case, according to the line 1616 of the screen definition information 6 shown in FIG. 27, the length of the string of characters for the field name 'ABFOBUHN' is 20 alphameric characters.

The processing flow of FIG. 21 then goes on to a step 807 at which the string of characters is substituted for the tag portion identified by the tag name 'X-OUTTXT' in the hypertext template. In this case, a string of 20 blank characters is substituted for the tag 913 shown in FIG. 22. Subsequently, the processing flow goes on to a step 808 at which the steps 802 to 807 are repeated for another appearance of the name of a tag acquired at the step 801 in the hypertext template shown in FIG. 22. As shown in the figure, the tag name 'X-OUTTXT' appears again in a tag 914. As a result, a string of 20 blank characters is also substituted for the tag 914 shown in FIG. 22.

When no more appearances of the name of a tag acquired at the step 801 of FIG. 21 are found in the hypertext template at the step 808, the processing flow returns to the step 801 at which the tag name 'X-INOUTTXT' is acquired next from the entry line 1013 of the synthesis rules shown in FIG. 23. from the tag 911 of the hypertext template shown in FIG. 22, the synthesis-parameter value for the synthesis-parameter name 'XFIELD' is found to be 'ABFEBUNR' while the synthesis-parameter value for the synthesis-parameter name 'XSIZE' is found to be '10' at the step 803.

According to the entry line 1013 of the synthesis rules shown in FIG. 23, a synthesis condition on the entry line 1016 pointed to by a pointer on the entry line 1013 is specified. Since no input is entered to the line, however, the synthesis condition 'ERR' described on the entry line 1016 is not applicable. Thus, the substitution character string described on the entry line 1017 is used to result in a display item 1305 of the hypertext shown in FIG. 26.

The above parts of processing are repeated for the tag name 'X-INOUTTXT' appearing in the tag 912 of the hypertext template shown in FIG. 22. The result of substitution this time is a display item 1306 of the hypertext shown in FIG. 26. According to the item 903 of the hypertext template shown in FIG. 22, there is an instruction '%SID%' for synthesizing the session ID. The session 'ID SID01' is substituted for the item '%SID%' itself. In addition, according to the item 904 of the hypertext template, there is an instruction '%COUNT%' for synthesizing the access count.

In the case of the example described above, the final result of the synthesis is the hypertext shown in FIG. 26. The processing flow shown in FIG. 20 then goes on to a step 713 at which the hypertext is transmitted to the browser 29. Upon receiving the hypertext shown in FIG. 26, the browser 29 displays the screen shown in FIG. 18. Reference numeral 503 of the screen shown in FIG. 18 is a string of characters displayed as indicated by the display item 1304 of the hypertext shown in FIG. 26. Reference numerals 501 and 502 of the screen are input fields displayed in accordance with display items 1305 and 1306 of the hypertext respectively. Reference numeral 504 of the screen is a button GUI displayed in accordance with a display item 1307 of the hypertext.

In the conventional online application processing system, the terminal message mapping means 10 creates control data for the host terminal apparatus 14 for the output logical information 230 shown in FIG. 24 by referencing the screen definition information 6 like the one shown in FIG. 27 and the host terminal apparatus 14 then displays a screen like the one shown in FIG. 16. Reference numerals 301 and 302 of the screen shown in FIG. 16 are conventional input fields corresponding to the input fields 501 and 502 of the screen shown in FIG. 18. However, the screen shown in FIG. 16 does not contain an input field corresponding to the input field 504 of the screen shown in FIG. 18. It should be noted that the dots '.' shown in the input fields 301 and 302 indicate that the display items 301 and 302 are each an input area.

Below is description of a processing procedure which is followed after the user enters 'MM' and 'MM3X10' to the input fields 501 and 502 of the screen shown in FIG. 18 respectively and then presses the button GUI.

When the button GUI is pressed, the browser 29 requests a next screen in accordance with the location information 1303 of the hypertext shown in FIG. 26. FIG. 31 is a diagram showing an example of a request for a hypertext transmitted by the browser 29 to the host computer. An item 2401 shown in FIG. 31 is acquired from the location information 1303 of the hypertext shown in FIG. 26 and sent back by the browser 29 to the host computer. A line 2402 associates the field value 'MM' entered to the input field 501 of the screen with the field name of the input field 501 which is acquired from the display item 1305 'NAME="ABFEBUNR"' of the hypertext shown in FIG. 26. Likewise, a line 2403 associates the field value "MM3X10' with the name of the field 502 acquired from the display item 1306 'NAME="ABFEBUHC"' of the hypertext.

Figure 19:
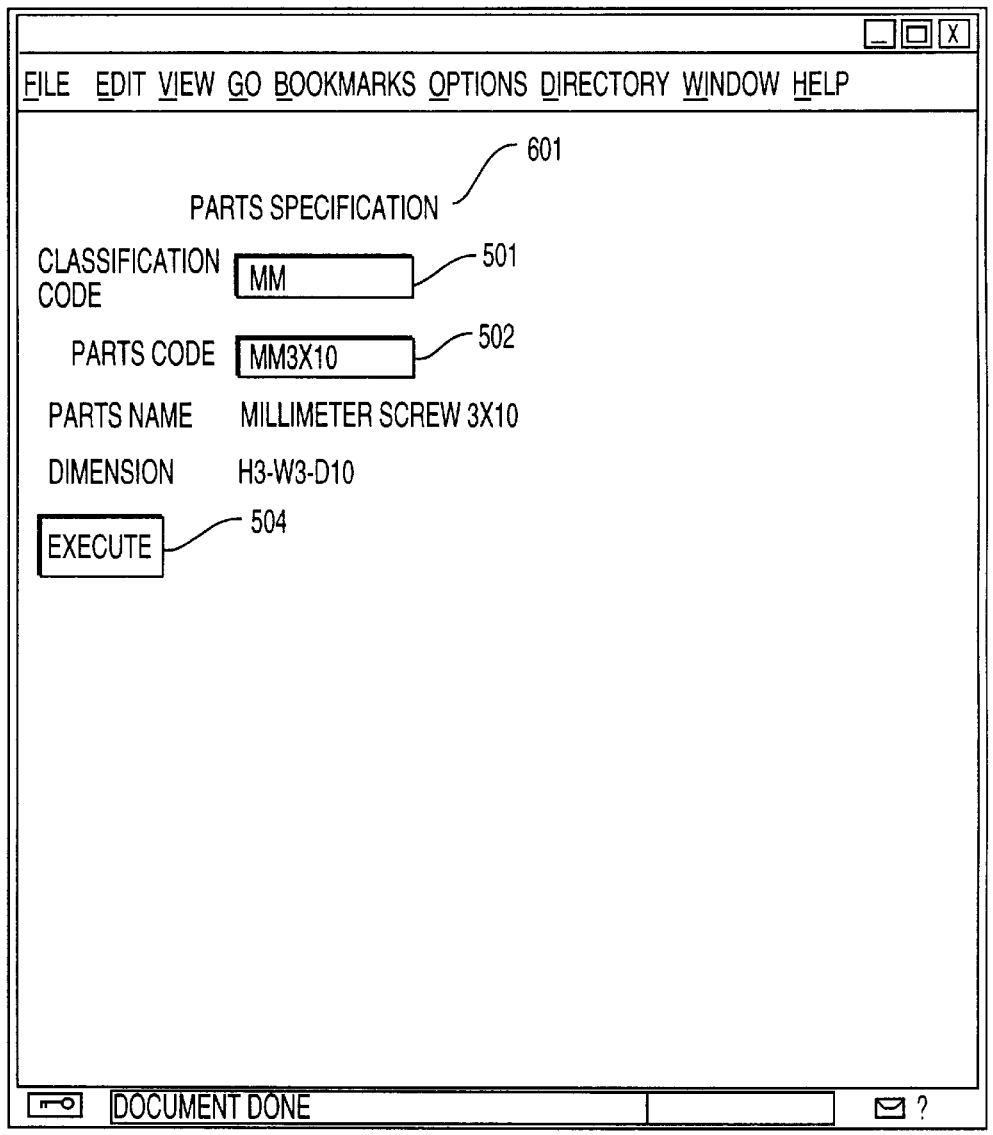
FIG. 19 is a diagram showing another example of a screen displayed by the online application processing system according to the present invention.

The processing flow shown in FIG. 20 then goes on to the step 709 to synthesize the output logical information 230 shown in FIG. 25 on the hypertext template of the screen 'ABP010' shown in FIG. 22 in order to produce a hypertext shown in FIG. 33 by following the same procedure of the steps 709 to 712. The processing flow then continues to the step 713 at which the hypertext is transmitted to the browser 29. The browser 29 then displays a screen shown in FIG. 19 in accordance with the hypertext received from the host computer.

According to the processing procedure described above, an existing online application program 9 which was generated by the online-program generating means 8 in accordance with the screen definition information can be executed in the configuration of the online application program 9. The hypertext synthesizing means 220 forms a hypertext by synthesizing a hypertext template 210 stored in advance with output logical information 230 produced by the online application program 9, which is developed to display information on a host terminal apparatus 14 and which can also be used in a configuration like the one shown in FIG. 14 that employs a browser 29 in place of a host terminal apparatus 14. As a result, an existing program asset can be utilized continuously even if the online application processing system employs a display means other than a host terminal apparatus designed specially for use in conjunction with the host computer 1. In the host computer 1, there exists a number of programs like the online application program 9. Since it takes a lot of labor and time to create and develop such programs, the capability of utilizing an existing program in a new computer environment is advantageous.

Next, another embodiment of the present invention is explained by referring to FIGS. 14, 22, 27 and 28. In this embodiment, a hypertext-template generating means 200 employed in the online application processing system shown in FIG. 14 for generating a hypertext template 210 from the screen definition information 6 is explained.

Figure 28:
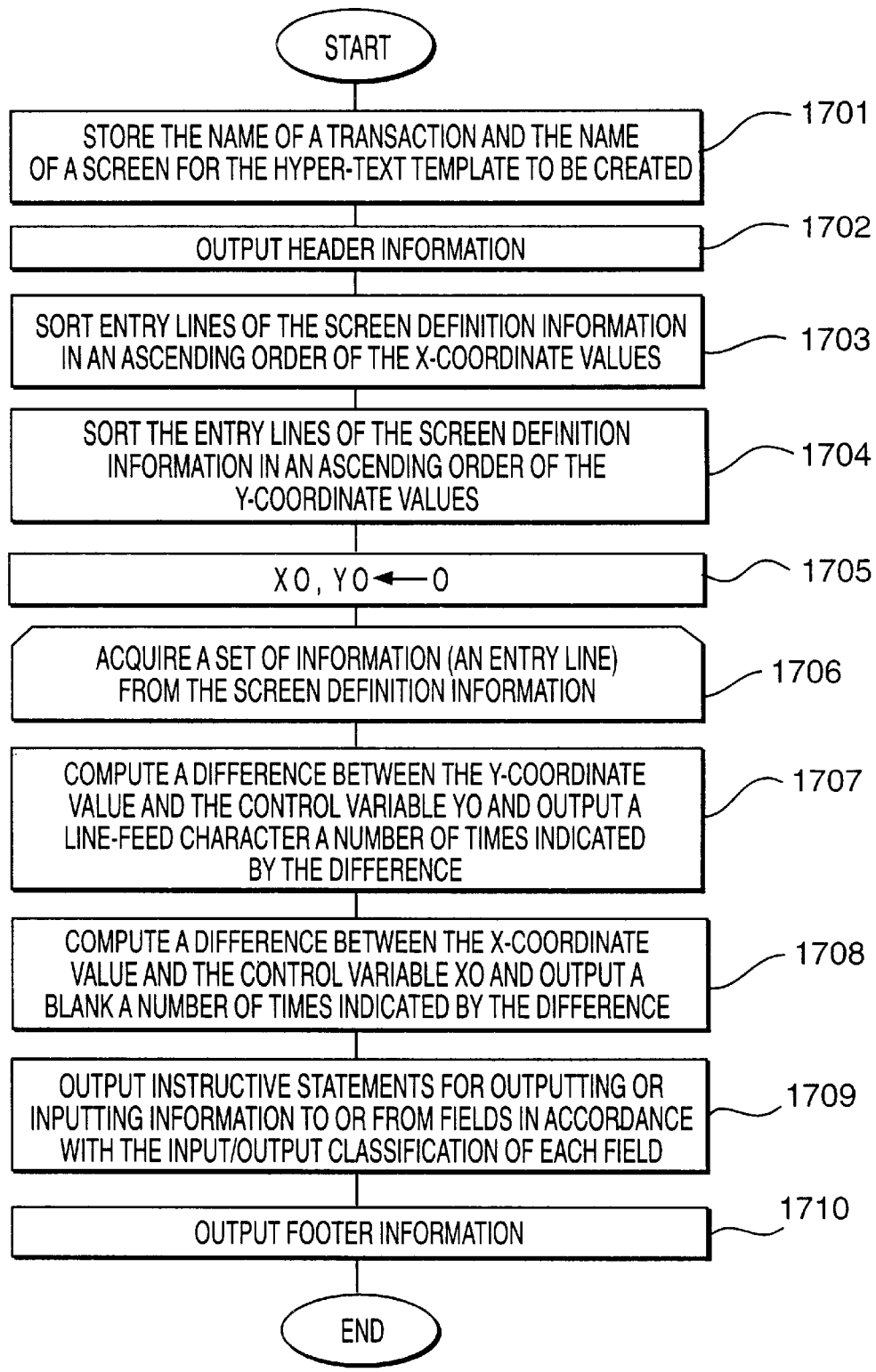
FIG. 28 is a schematic flow diagram showing a procedure of processing carried out in generating a hypertext-template.
Figure 29:
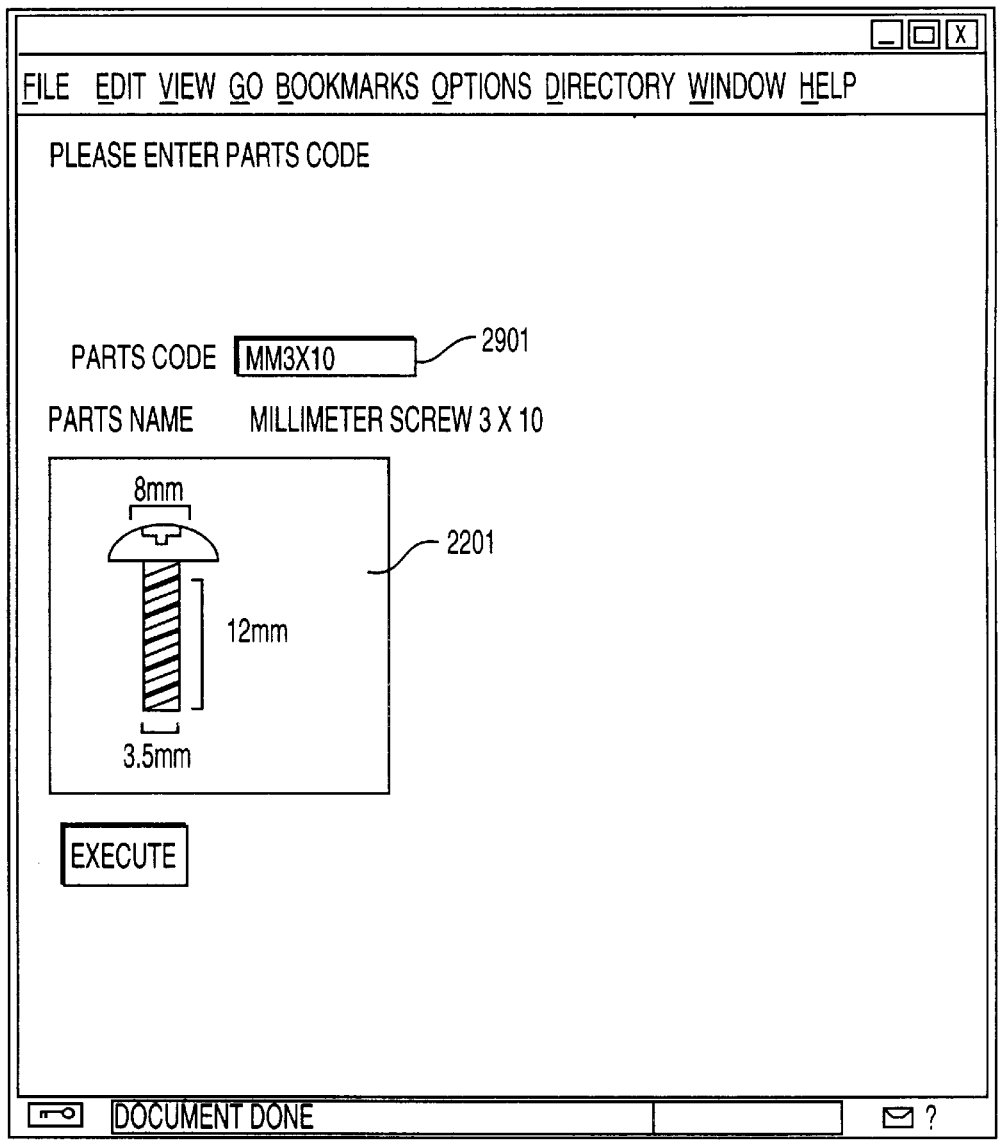
FIG. 29 is a diagram showing an example of a screen display including a picture image.
Figure 30:
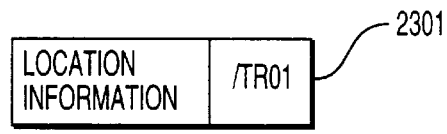
FIG. 30 is a diagram showing an example of a request for hypertext received from a browser at a step 703 of the procedure shown in FIG. 20.

FIG. 28 is a schematic flow diagram showing the procedure of processing carried out by the hypertext-template generating means 200. As shown in the figure, the processing flow begins with a step 1701 at which the name of a transaction and the name of a screen for which a hypertext template is to be created are stored at the request of a user. The processing flow then goes on to a step 1702 at which header information is output. The items 905 and 901 of the hypertext template shown in FIG. 22 are the header information. A portion 902 is the name of a transaction stored at the previous step. The remaining portions are fixed character strings for which it is thus not necessary to refer to the screen definition information 6 at this step.

The processing flow of FIG. 28 then proceeds to a step 1703 at which the screen definition information 6 is sorted in an ascending order of the X-coordinate values. The processing flow then proceeds to a step 1704 at which the screen definition information 6 is sorted in an ascending order of the Y-coordinate values. The sorting operations carried out at the steps 1703 and 1704 result in screen definition information 6 starting with an entry having a smallest Y-coordinate value. If there are a plurality of entries having the same Y-coordinate value, these entries are sorted in an ascending order of the X-coordinate values. FIG. 27 is a diagram showing an example of the screen definition information 6 resulting from the sorting operations.

The processing flow of FIG. 28 then continues to a step 1705 at which control variables X0 and Y0 are cleared. Then, the processing flow goes on to a step 1706 at which a set of information (or an entry line) is acquired from the screen definition information 6. for example, information on the entry line 1610 of the screen definition information shown in FIG. 27 is acquired. The processing flow then proceeds to a step 1707 at which a difference between the Y-coordinate value 1606 and the control variable Y0 is computed. A line-feed character is output the number of times indicated by the difference. The control variable Y0 is then updated. Since the Y-coordinate value 1606 is 2, the line-feed character is output twice and the number 2 is set to the control variable Y0. The first line-feed character is output at the end of the item 901 of the hypertext template shown in FIG. 22 and the second line-feed character is output to generate a blank line between the items 901 and 908. The processing flow then goes on to a step 1708 at which a difference between the X-coordinate value 1605 and the control variable X0 is computed. A blank character is output a number of times indicated by the difference. The control variable X0 is then updated. Since the X-coordinate value 1606 is 10, the blank character is output ten times and the number 10 is set to the control variable X0. The ten blank characters are output to produce a string of blank characters 908 of the hypertext template shown in FIG. 22.

The processing flow of FIG. 28 then continues to a step 1709 at which instruction statements for outputting or inputting information to or from fields are output in accordance with the input/output classification of each field. For example, in the case of an entry line 1610 of the screen definition information shown in FIG. 27, the fixed type is described in the input/output classification. Accordingly, a string of characters 'Part Specifications' described in the entry field 1609 of the screen definition information is output as an item 909 of the hypertext template shown in FIG. 22. In the case of an entry line 1612 of the screen definition information, an input/output type is described in the input/output classification. Accordingly, the tag 'X-INOUTTXT' for the input/output type is used to display '<X-INOUTTXT XFIELD=' to be followed by the name of a field 1603 enclosed by quotation marks, and finally the symbol '>' to indicate the end of the tag. The result is the tag 913 shown in FIG. 22.

The steps 1706 to 1709 are carried out for each entry line of the screen definition table shown in FIG. 27. Then, the processing flow goes on to a step 1710 at which footer information is output. The footer information is a string of characters like items 906 and 907 of the hypertext template shown in FIG. 22.

Accordingly to the processing procedure described above, a hypertext template 210 like the one shown in FIG. 22 is created from screen definition information 6 like the one shown in FIG. 27. the online application program 9 shown in FIG. 14 is a software asset which was already created in the past. There exists a number of such already created software assets in the host computer 1. One of the problems encountered in the industry is how such online application software assets can be effectively utilized. According to the present embodiment, a hypertext template 210 can be created by making use of the screen definition information 6 which is understood to have been provided for in the creating of the online application program 9, resulting in an effect that an online application processing system implemented by the present invention can be built with ease.

We claim:

1. An online application processing system having a first computer which acts as a host, communication means, and a second computer which includes a keyboard and a display unit capable of displaying graphics, comprising:

said first computer having an application program source code, first screen definition information and online application program generating means, said first screen definition information defining an input-output correspondence table for accommodating field names of data fields and display coordinates in an online application processing screen and for at least specifying an input-output distinction distinguishing an input from an output; and said online application program generation means generating, on the basis of said application program source code and said first screen definition information, an online application program that displays a screen on an apparatus connected with said communication means in accordance with said first screen definition information and to perform online application processing in accordance with processing procedures written in said application program source code;

wherein said second computer comprises second screen definition information and GUI processing program generating means, said second screen definition information being acquired by copying said first screen definition information, said GUI processing program generating means generating, on the basis of said second screen definition information, a GUI processing program for interactively communicating with a user through a GUI display and communicating with said online application program via said communication means.

2. An online application processing system according to claim 1, wherein said GUI processing program generating means includes character data display process generating means responsive to when said input-output distinction is set for an output in said second screen definition information, said character data display process generating means thereupon generating a process for displaying character data in positions designated by said display coordinates through the use of a character display GUI; character data input process generating means responsive to when said input-output distinction is set for an input in said second screen definition information, said character data input process generating means thereupon generating a process for accepting user instructions for inputting character data from positions designated by said display coordinates through the use of a character input GUI; user data input termination process generating means for generating a button-type GUI process for allowing a user to designate termination of data input; program data reception and display process generating means for generating a process for receiving data from said online application program via said communication means and displaying the received data through said character display GUI; and character data transmission process generation means for generating a process for transmitting the character data received through said character input GUI to said online application program via said communication means acting when termination of data input is designated via said button-type GUI.

3. An online-application processing system comprising a host computer, a communication means and a browser provided with a display unit or a television and a graphic display function, wherein said host computer has:

an application program source code;

screen definition information defining a table with each entry thereof containing a field name and display coordinates of a data field on an online application processing screen as well as an input/output classification at least describing whether said data field is an input or output data field;

a hypertext template having information including said field name and a string of characters or a string of symbols specifying a display command to request said browser to display data of said data field as well as information including said field name and a string of characters or a string of symbols specifying an input command to request said browser to associate data entered by the user with said field name and transmit said entered data to said host computer;

an online application program for outputting output logical information indicating association of data to be displayed in said data field defined as an output data field by said input/output classification in said screen definition table with said field name of said data field, and for inputting input logical information indicating association of data entered to said data field defined as an input data field by said input/output classification thereof in said screen definition table with said field name of said data field and further for performing online application processing in accordance with a processing procedure prescribed in said job program source code by outputting said output logical information and inputting said input logical information repeatedly;

an online application program generating means for generating said online application program from said job program source code and said screen definition information;

a hypertext synthesizing/transmitting means for synthesizing a hypertext from said output logical information output by said online application program and said hypertext template having said information including said field name and said string of characters or said string of symbols specifying a display command and for transmitting said hypertext to said browser wherein said hypertext is synthesized by acquiring output data to be displayed in said data field identified by said field name from said output logical information and substituting said acquired output data for said string of characters or said string of symbols specifying a display command; and a field-input-value acquiring means for receiving input data entered by the user to said browser with said input data associated with said field name included in said hyper text from said browser by way of said communication means and for supplying said input logical information showing association of said input data with said field name to said online application program wherein said association is set by said browser by associating said input data with said field name in accordance with said field name and said string of characters or said string of symbols included in said hypertext for specifying an input command, and wherein said browser receives said hypertext transmitted to said hypertext synthesizing/transmitting means by way of said communication means, displays said output data in accordance with said string of characters or said string of symbols included in said hypertext for specifying an output command to display said output data and has a means for acquiring said input data entered by the user, associating said input data with said field name in accordance with said field name and said string of characters or symbols included in said hypertext for specifying an input command and transmitting said input data with said input data associated with said field name.

4. An online application processing system according to claim 3, wherein:

said screen definition information used by said host computer further includes a data type for each data field for prescribing allowable values that can be entered into said data field as data;

said host computer further has an input checking means for examining whether or not data entered by the user to a data field is a value allowed by said data type for said data field included in said screen definition information; and said hypertext synthesizing/transmitting means employed by said host computer for synthesizing a hypertext and transmitting said hypertext to said browser is a means which, when said input checking means determines that data entered by the user is not an allowable value for a data field, synthesizes a string of characters or symbols in another hypertext and transmits said other hypertext to said browser with said string of characters or symbols used for requesting said browser to perform one of changing the color of said data field, enclosing said data field in a frame, displaying the field name of said data field and displaying a message indicating that said data entered into said data field is not allowed by using another display means so as to make the user aware that said unallowable data has been entered to said data field.

5. An online application processing system according to claim 3, wherein:

said host computer further has a field input value storing means for storing data entered by the user with said data associated with a field name;

said hypertext template used by said host computer has at least a first hypertext template used in a first display or input operation and a second hypertext template used in a second display or input operation to display said output logical information, which is output only once by said online application program, to be displayed two or more times and in order to allow pieces of data entered by the user two or more times to be included altogether in said input logical information to be supplied to said online application program only once;

said field-input-value acquiring means employed in said host computer for supplying input logical information showing association of input data entered by the user with a field name to said online application program is a means for storing said input data with said input data associated with said field name in said field input value storing means, for examining whether or not data for all data fields each defined as an input data field by said input/output classification thereof in said screen definition table has been stored in said field input value storing means and for supplying said input logical information showing association of input data entered by the user with field names only if data for all data fields each defined as an input data field by said input/output classification thereof in said screen definition table is found stored in said field input value storing means; and said hypertext synthesizing/transmitting means employed by said host computer for synthesizing a hypertext from a hypertext template and transmitting said hypertext to said browser is a means for synthesizing a first hypertext first of all from said first hypertext template and transmitting said first hypertext to said browser and then for synthesizing a second hypertext from said second hypertext template and transmitting said hypertext to said browser only if data for all data fields each defined as an input data field by said input/output classification thereof in said screen definition table has not been stored in said field input value storing means.

6. An online application processing system according to claim 3, wherein:

said hypertext template used by said host computer includes tags each showing said hypertext synthesizing/transmitting means for synthesizing said hypertext from said hypertext template how a synthesis is to be carried out, and one or a plurality of tag parameters associated with each of said tags;

said host computer is further provided with synthesis rules each including a condition for determining whether or not a synthesis is to be carried out for one of said tags using said tag parameters associated with said tag and a description of a string of characters or a string of symbols to be synthesized in said hypertext if said condition is satisfied with; and said hypertext synthesizing/transmitting means employed by said host computer for synthesizing a hypertext from a hypertext template and transmitting said hypertext to said browser is a means which, for each of said tags included in said hypertext template, evaluates said condition by using said tag coefficient or said tag coefficients associated with said tag included in said synthesis rule for said tag, further examines another synthesis rule if said condition is not satisfied, synthesizes a hyper text using a strong of characters or a strong of symbols described in a synthesis rule for said tag if said condition of said synthesis rule is found satisfied and transmits said synthesized hypertext.

7. An online application processing system according to claim 3, wherein said host computer further includes a means for generating a hypertext template for generating said hypertext template from said screen definition information by:

generating a string of characters or a string of symbols for specifying a command to display data of a data field defined as an output data field by said input/output classification thereof in said screen definition table at a position on said browser indicated by said display coordinates; and generating a string of characters or a string of symbols for specifying a command to enable an operation to input data entered by the user at a position on said browser indicated by said display coordinates for a data field defined as an input data field by said input/output classification thereof in said screen definition table and to transmit said input data to said host computer by associating said input data with the field name of said data field.

8. An online application processing system including a computer and a browser connected to said computer through an internet, said computer comprising:

an online application generation means for generating an online application program from an application program source code and screen definition information;

a data conversion means for performing conversion between I/O data operated in said online application program and hypertext operated in said browser based on said screen definition information; and a communication controller for transferring said hypertext to said browser through said internet.

9. A method for processing an online application by using a first computer and a second computer which are connected to each other, comprising the steps of:

generating with said first computer, on the basis of application program source code and a screen definition information defining attribute of data inputted or outputted on an online application processing screen, an online application program for executing said online application through a screen of said second computer displayed on the basis of said screen definition information; and generating with said second computer, on the basis of said screen definition information inputted from said first computer, GUI processing program for executing interactively said online application program through a screen of said second computer displayed on the basis of said screen definition information.

* * * * *